(12) United States Patent
Palesch

(10) Patent No.: US 8,944,954 B2
(45) Date of Patent: Feb. 3, 2015

(54) GEARING

(75) Inventor: Edwin Palesch, Lenningen (DE)

(73) Assignee: A+M Fertigungstechnik GmbH, Oberboihingen (DE)

( * ) Notice: Subject to any disclaimer, the term of this patent is extended or adjusted under 35 U.S.C. 154(b) by 336 days.

(21) Appl. No.: 13/582,439

(22) PCT Filed: Feb. 14, 2011

(86) PCT No.: PCT/EP2011/000677
§ 371 (c)(1),
(2), (4) Date: Nov. 13, 2012

(87) PCT Pub. No.: WO2011/107217
PCT Pub. Date: Sep. 9, 2011

(65) Prior Publication Data
US 2013/0053205 A1 Feb. 28, 2013

(30) Foreign Application Priority Data
Mar. 1, 2010 (DE) .......... 10 2010 010 663

(51) Int. Cl.
*F16H 37/06* (2006.01)
*F16H 47/04* (2006.01)
*F16H 37/08* (2006.01)

(52) U.S. Cl.
CPC ........ *F16H 47/04* (2013.01); *F16H 2037/0886* (2013.01); *F16H 2200/2017* (2013.01)
USPC .......................................... 475/331; 475/343

(58) Field of Classification Search
USPC .................................................. 475/331, 343
See application file for complete search history.

(56) References Cited

U.S. PATENT DOCUMENTS

| 4,985,011 | A * | 1/1991 | Asada et al. .............. 475/278 |
| 6,884,197 | B2 * | 4/2005 | Ishimaru et al. .......... 475/271 |
| 2003/0109353 | A1 * | 6/2003 | Miyazaki et al. ........ 475/275 |
| 2003/0224899 | A1 * | 12/2003 | Ishimaru et al. ........ 475/275 |
| 2004/0014549 | A1 * | 1/2004 | Choi ...................... 475/269 |
| 2004/0077452 | A1 * | 4/2004 | Ishimaru et al. ........ 475/271 |
| 2010/0323836 | A1 * | 12/2010 | Wang et al. ................ 475/1 |

FOREIGN PATENT DOCUMENTS

| DE | 40 27 724 A1 | 4/1991 |
| DE | 101 23 105 A1 | 11/2002 |
| EP | 0 003 397 A1 | 8/1979 |
| EP | 0465 752 A1 | 1/1992 |
| EP | 0 059 055 A2 | 12/2012 |
| WO | 00/43695 | 7/2000 |
| WO | 2010/112159 | 10/2010 |

* cited by examiner

*Primary Examiner* — Derek D Knight
(74) *Attorney, Agent, or Firm* — Gudrun E. Huckett

(57) ABSTRACT

The gearing has an input element (8) which is connected in terms of drive to an output element (9) via gearing elements. One of the gearing elements is a regulating element (12) with which the rotational speed of the input element (8) can be changed for passing on to the output element (9). The rotational speed of the output element (9) is increased when the rotational speed of the regulating element (12) decreases. The torque present at the input element (8) is conducted on via the regulating element (12) to the output element (9) such that the input torque is present at the latter.

11 Claims, 20 Drawing Sheets

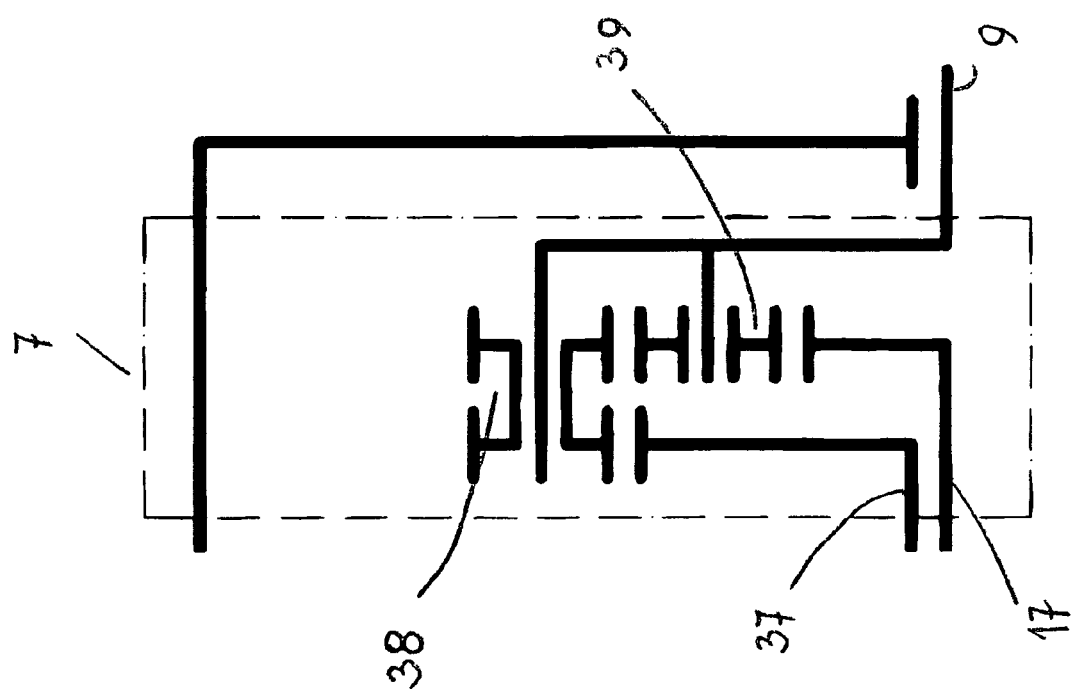

GEARING

Figure 1:
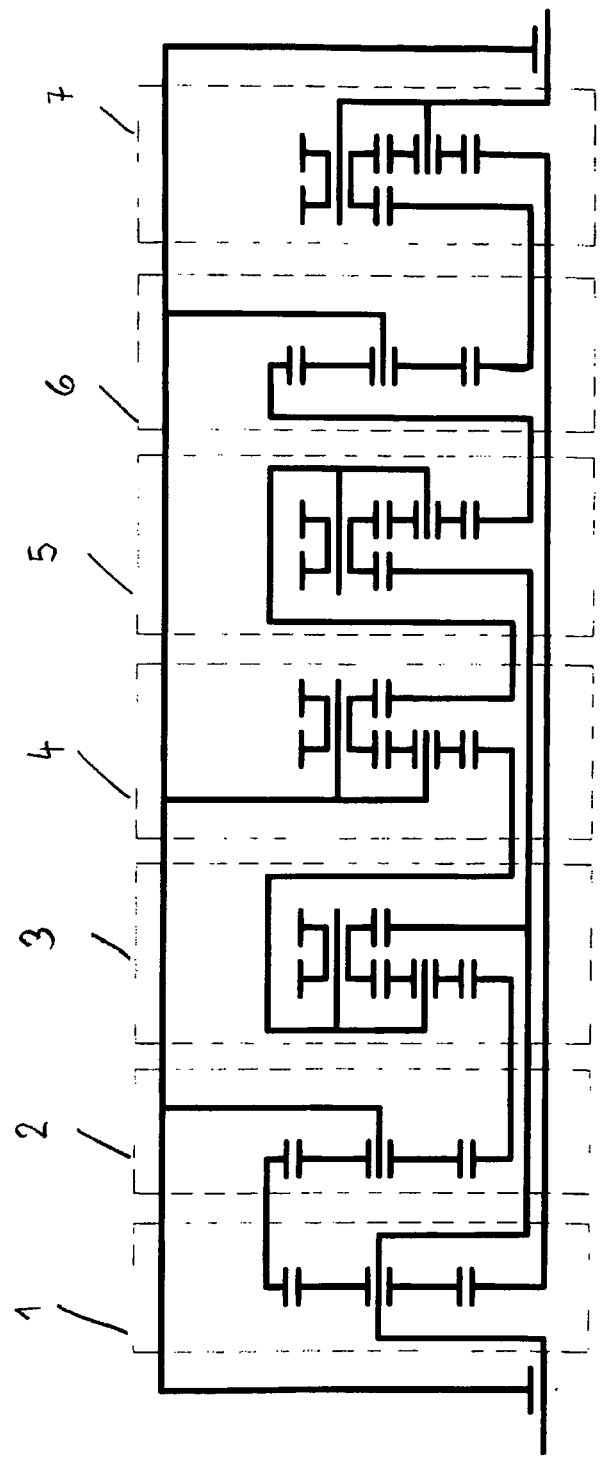

The invention concerns a gearing according to the preamble claim 1.

Transmissions serve the purpose of changing the rotational speed of an input element into a deviating rotational speed of an output element. Transmissions can have a fixed or a selectable transmission ratio. In transmissions with adjustable transmission ratios, stepped, switchable and variably adjustable transmission ratios are provided. Stepped transmission ratios are realized with manually shiftable or automatically shiftable multi-speed transmissions. Such transmissions are, for example, manual transmissions, manual transmissions automatically shifted, automatic transmissions, and dual-clutch transmissions. These different transmissions have in common that the functional elements have a predetermined fixed stepped transmission ratio.

Transmissions with variable, freely adjustable transmission ratio are, for example, friction drives, friction cone drives, toroid drives and continuously variable transmissions. In this context, transition ratios from standstill of the output element to a maximum transition ratio can be realized, depending on the embodiment of the transmission. With the exception of the toroid transmission that can be designed with a so-called zero passage, the other mechanical transmissions require a start-up clutch in order to adjust the difference of the rotational speeds from standstill to the minimal rotational speed.

Further known transmissions are distribution and superposition gears. Such transmissions have mechanical and hydraulic or mechanical or electromotoric load degrees. In these transmissions, usually no start-up clutch is required because with the electrical or hydraulic load path a variable transmission ratio beginning at the zero point can be realized.

All described transmissions convert the input torque in accordance with the transmission ratio into an output torque. The efficiency of the transmission depends on its configuration. In a manually shiftable transmission, friction, rolling and so-called churning losses are detrimental to performance. In automatically shifted transmissions, such as manual transmission automatically shifted, the losses by actuator elements such as hydraulic pumps, are to be added also to the mechanical losses. In transmissions with power distribution, performance losses occur in the power branches.

It is an object of the invention to design a transmission of the aforementioned kind in such a way that, as a mechanical transmission, it has a simple configuration and is embodied as a self-contained system such that it requires no external torque support.

This object is solved for a transmission of the aforementioned kind in accordance with the invention with the characterizing features of claim 1.

In the transmission according to the invention, one of the transmission elements between the input and the output elements is the control element with which the rotational speed of the input element can be changed for transmission onto the output element. When the rotational speed of the control element decreases, the rotational speed of the output element is correspondingly increased.

The torque that exists at the input element is transmitted through the control element to the output element so that the input torque is provided thereat.

Advantageously, the control element is in driving connection with the output element by means of a coupling element. The coupling element, in turn, is advantageously in driving connection by means of a support element with the output element. By means of the coupling element and the support element, it is thus possible to add so much torque onto the input element and the support element that at the output element the required output torque is present. This torque transmission thus follows the total transmission ratio.

Further features of the invention result from the additional claims, the description, and the drawings.

Figure 2:
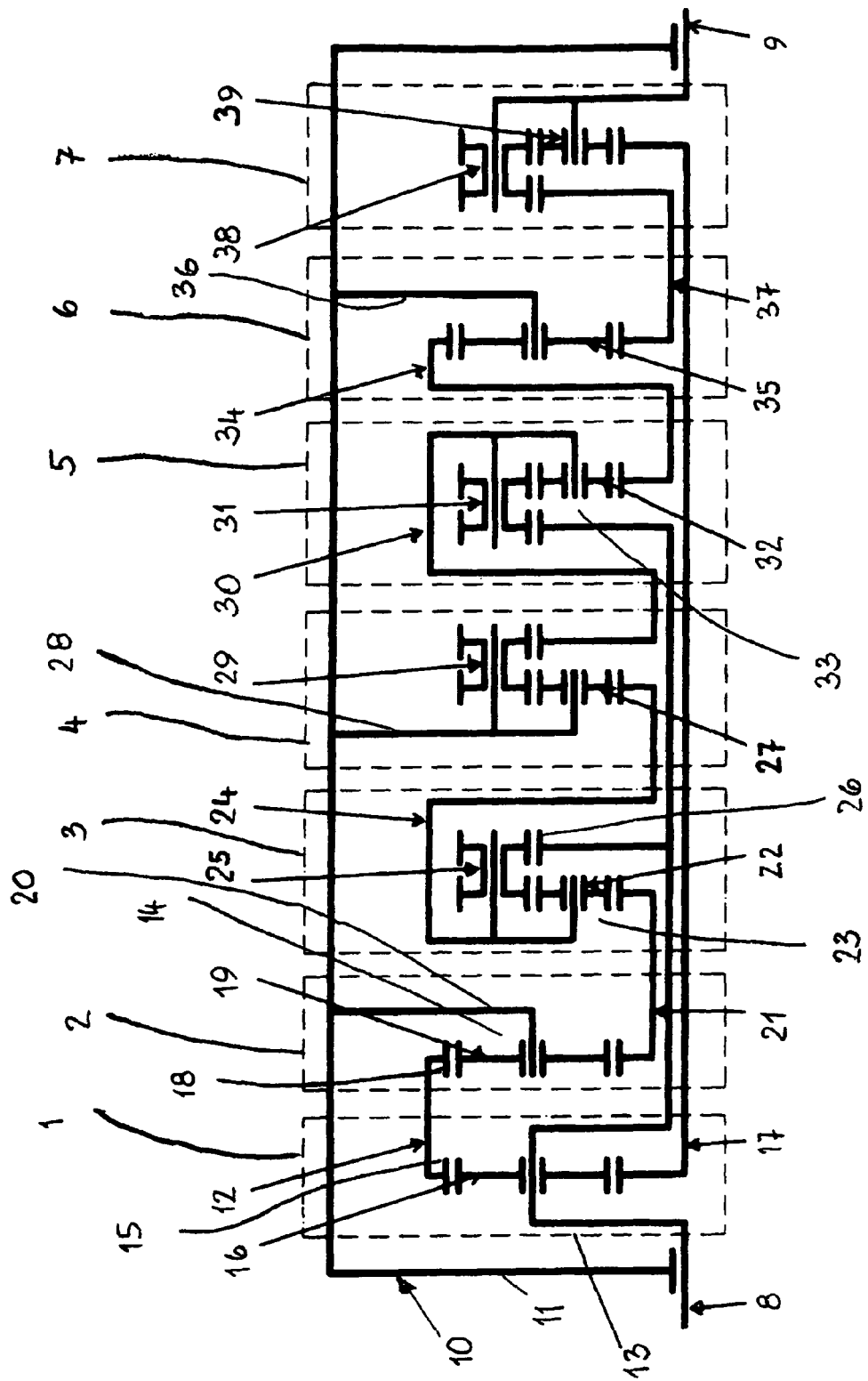
Figure 3:
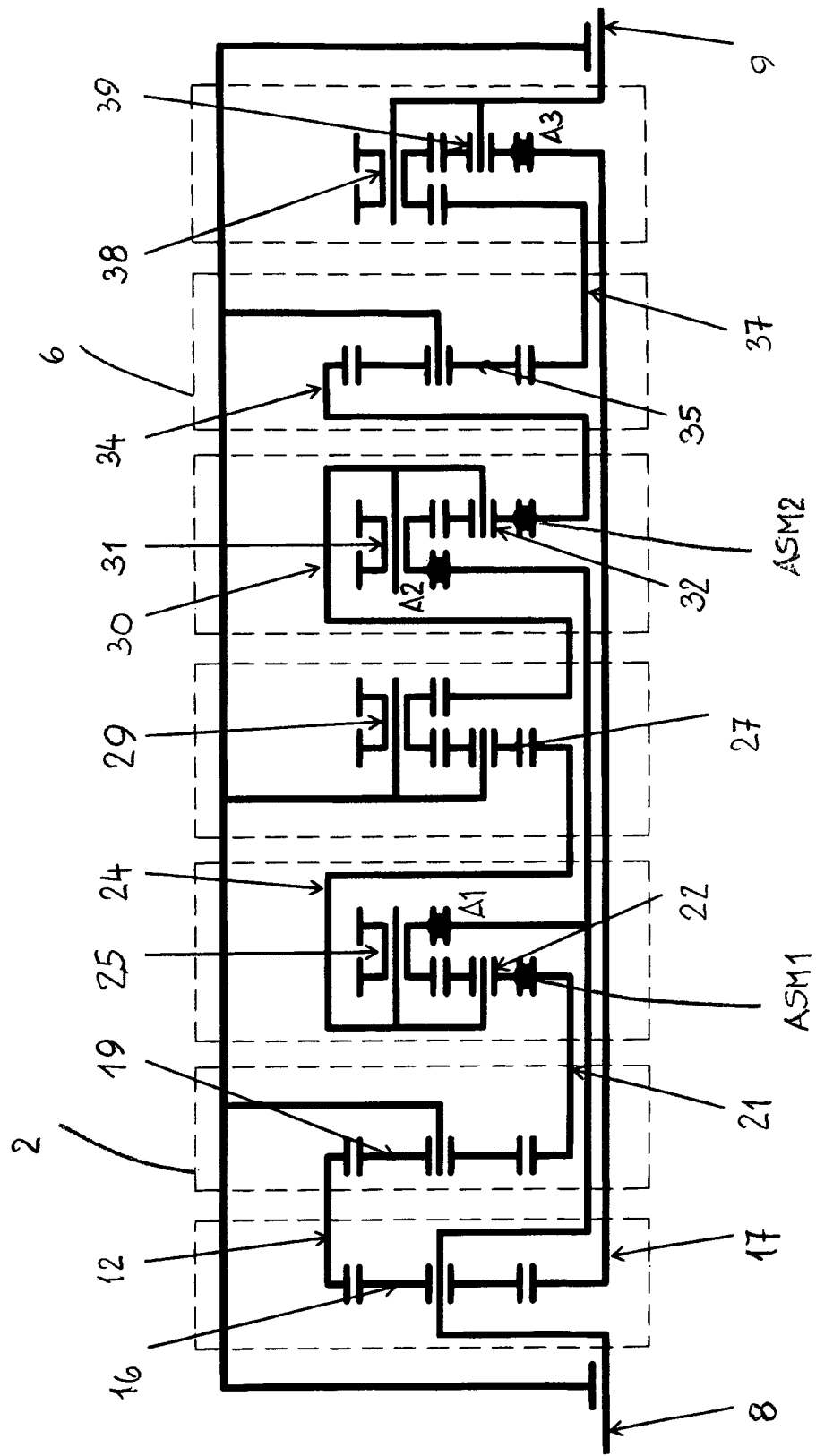
Figure 4:
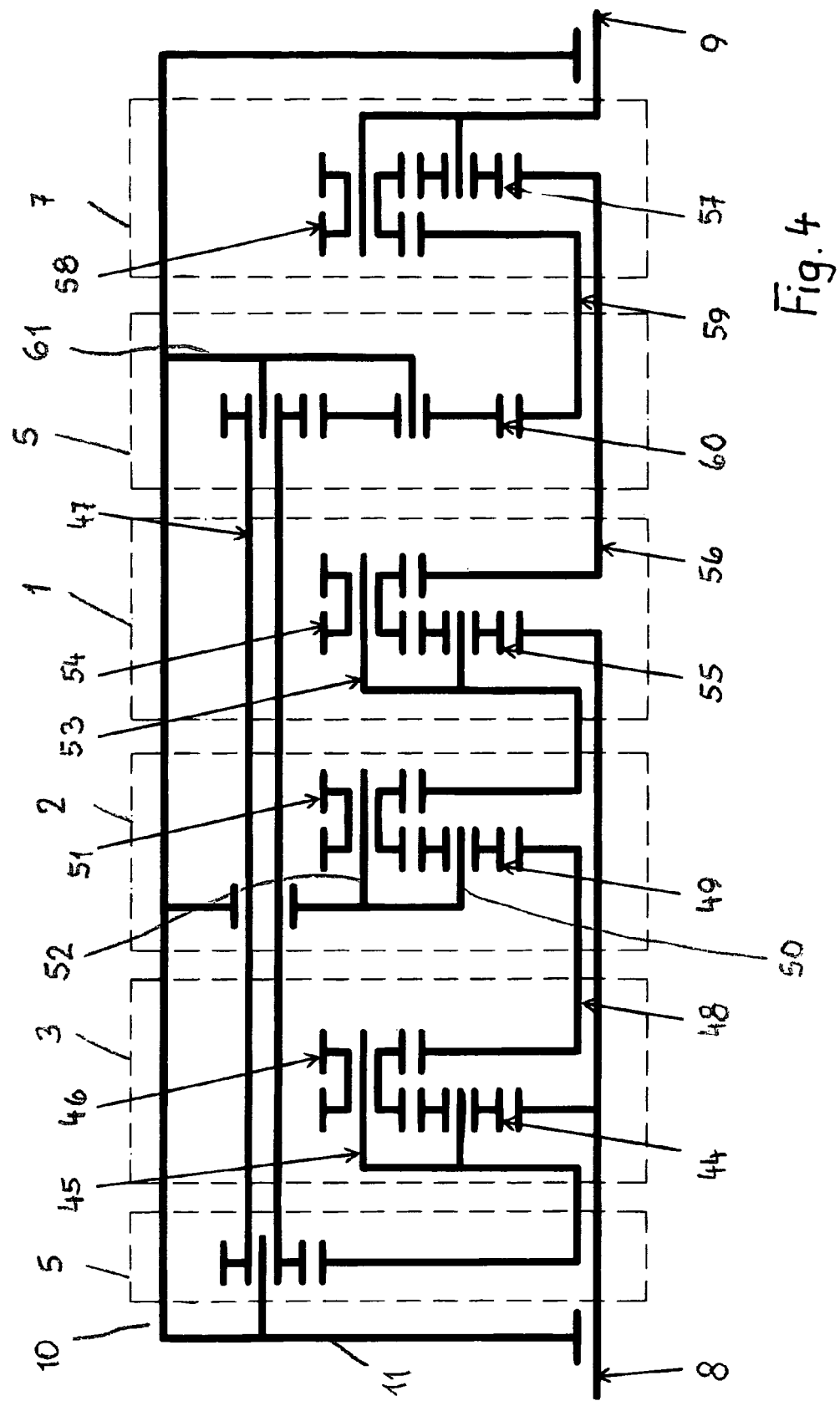
Figure 5:
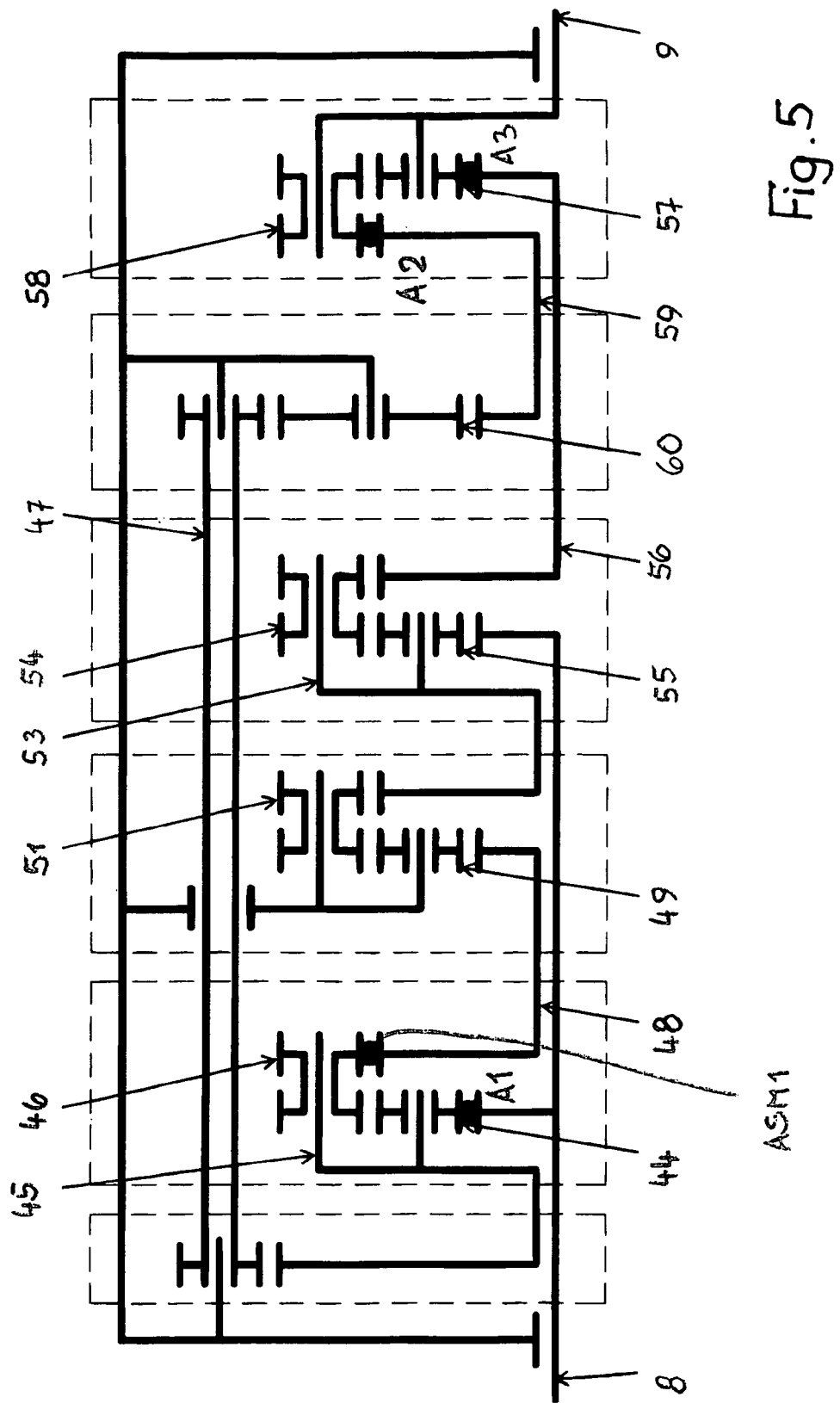
Figure 7:
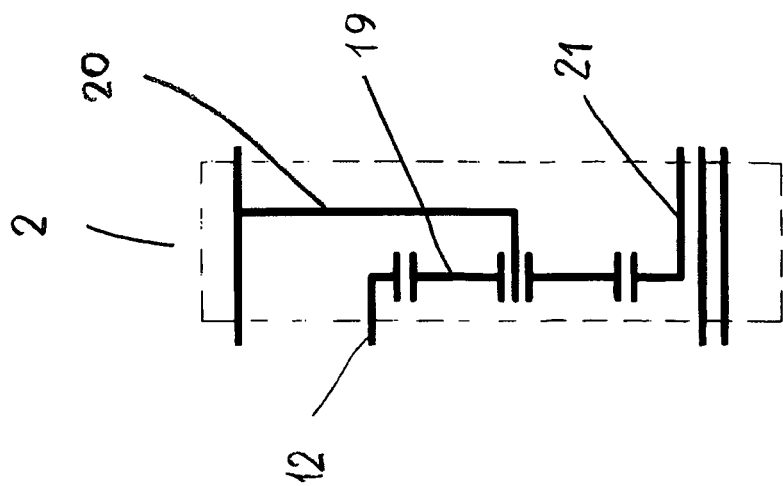
Figure 6:
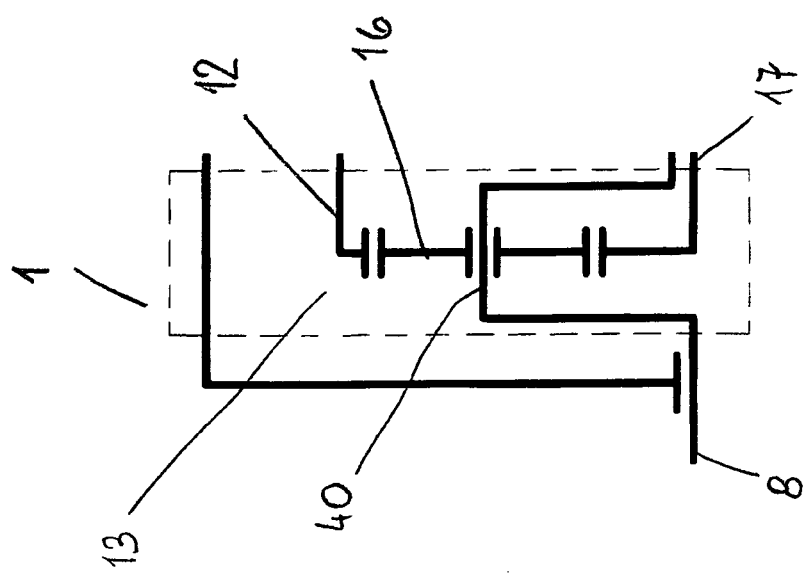
Figure 9:
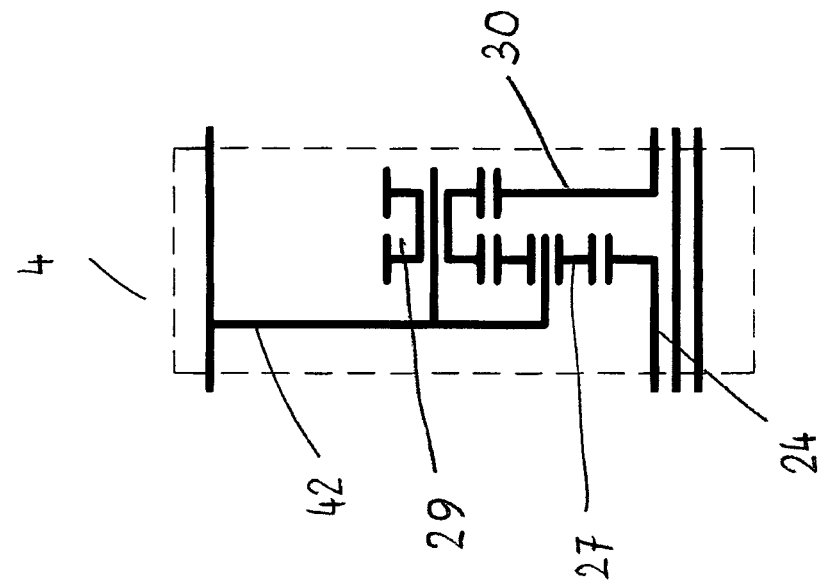
Figure 8:
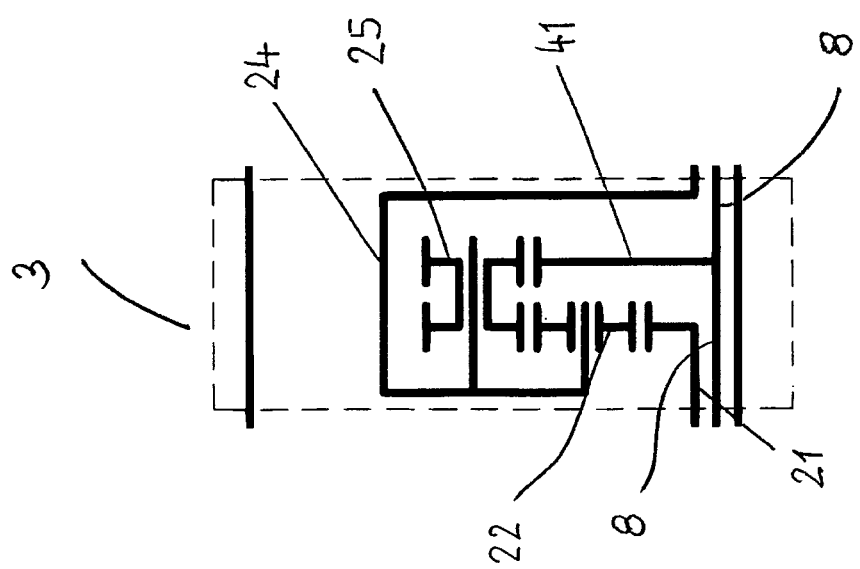
Figure 11:
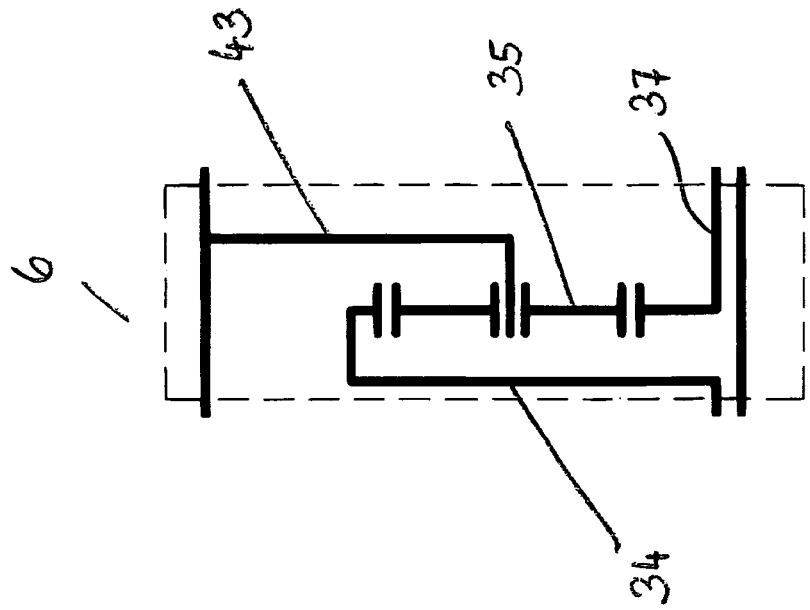
Figure 10:
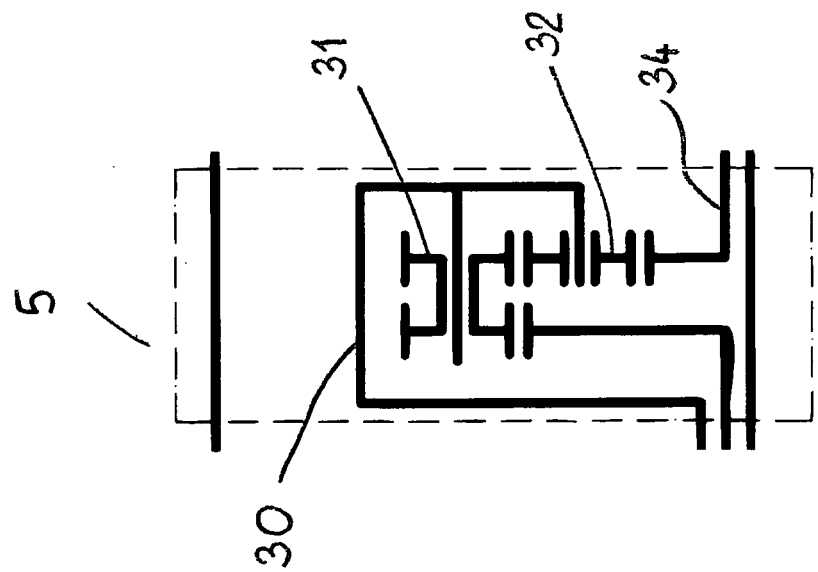
Figure 14:
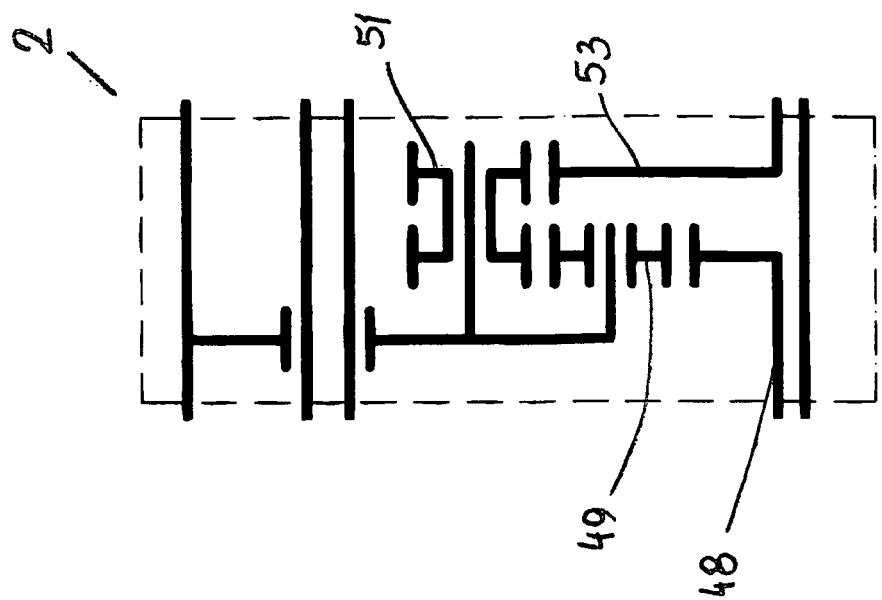
Figure 13:
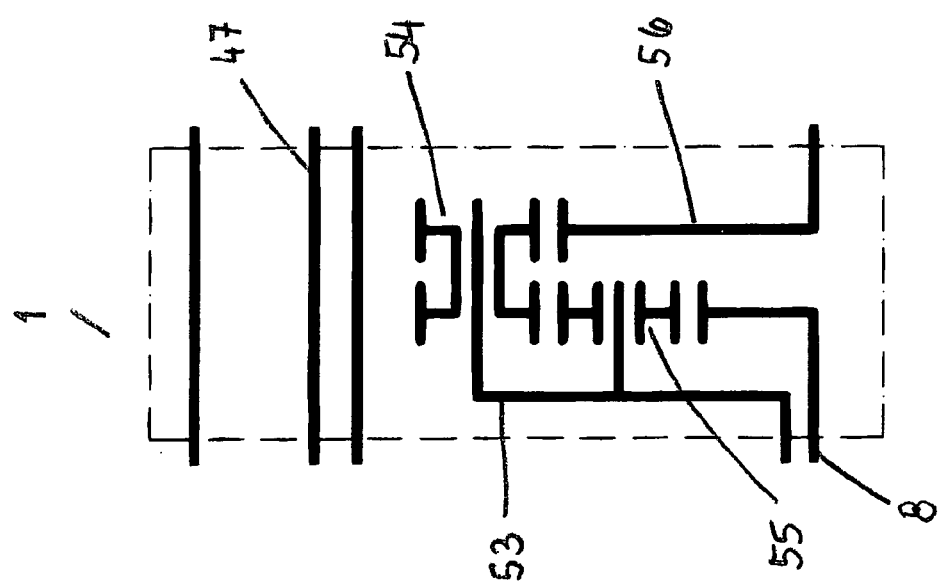
Figure 16:
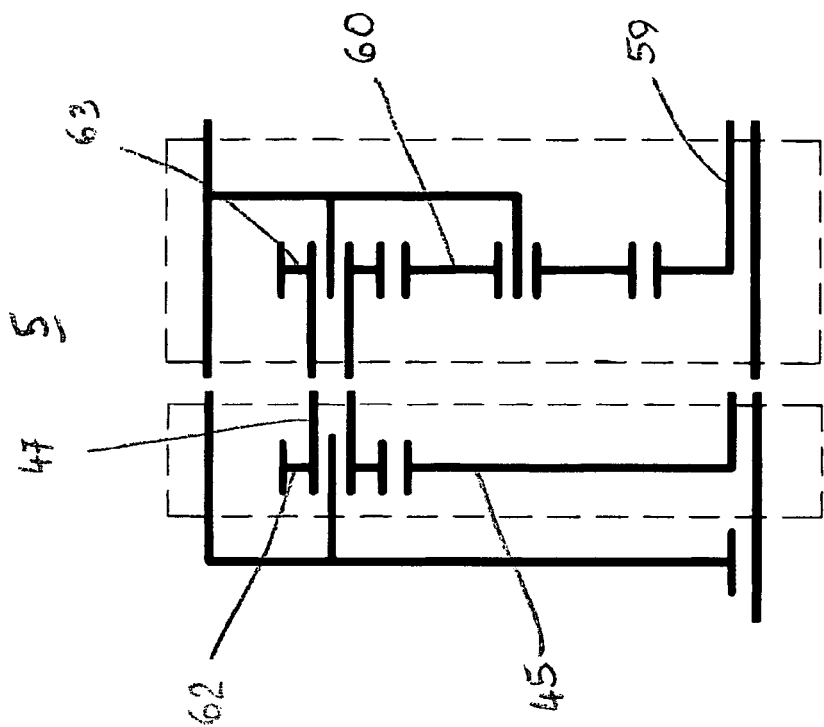
Figure 15:
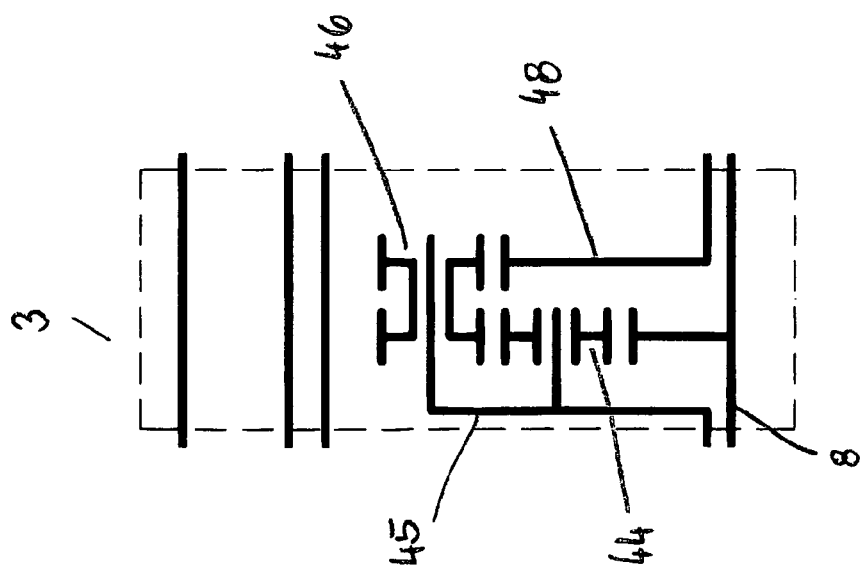
Figure 17:
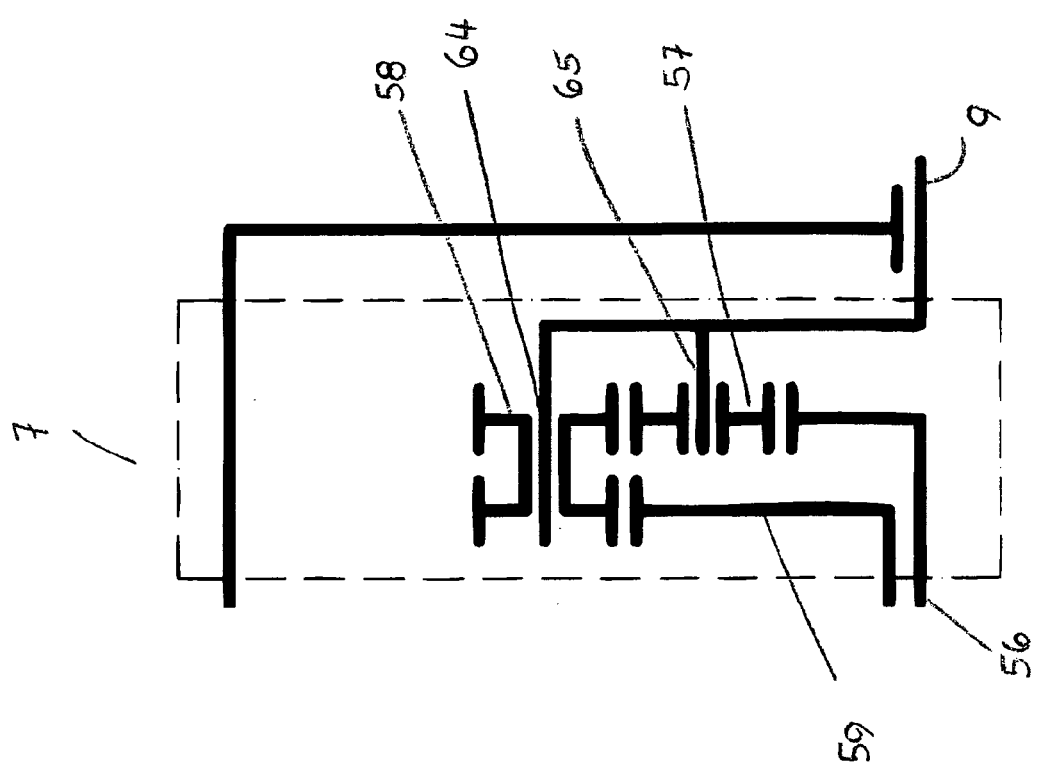
Figure 18:
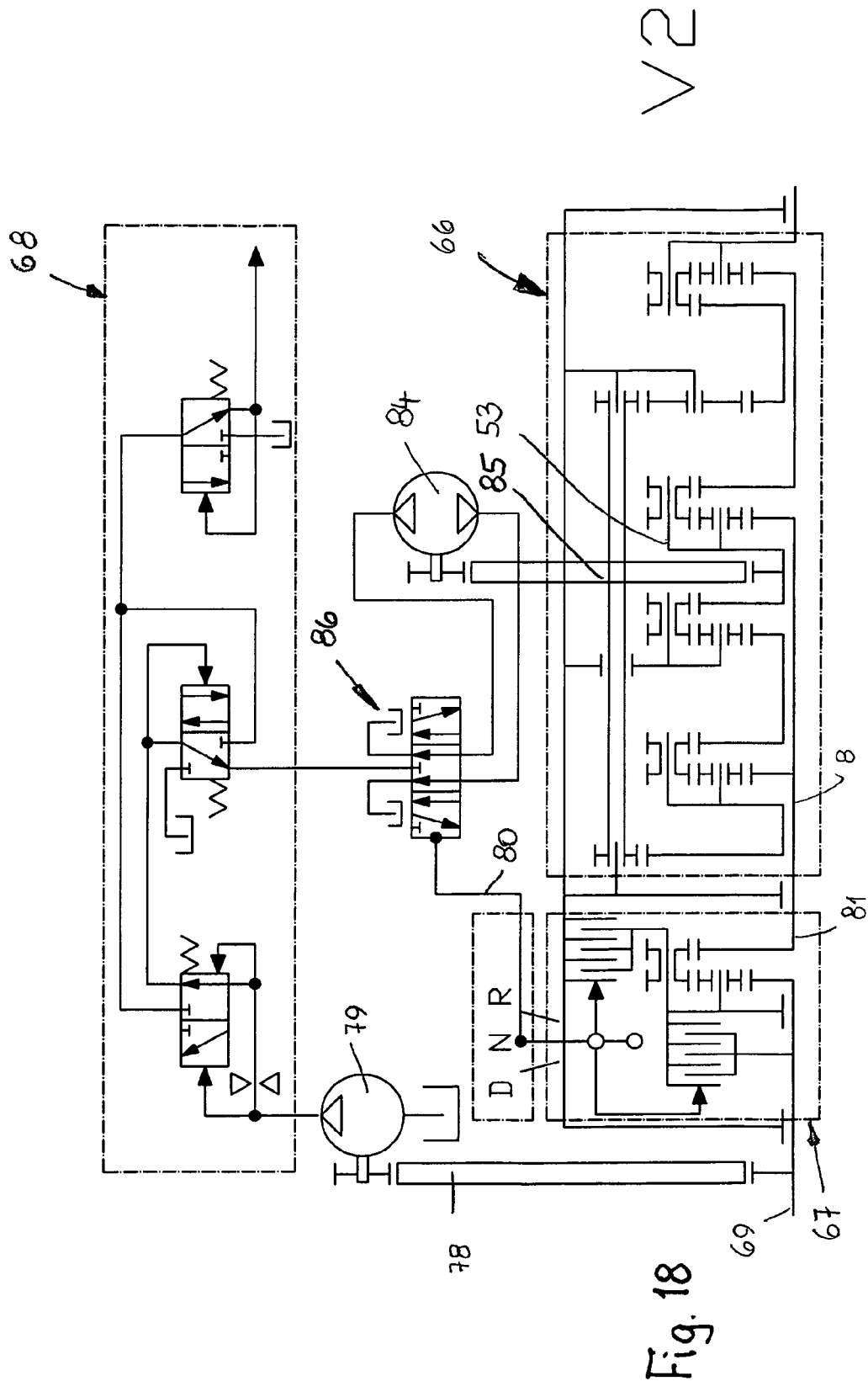
Figure 19:
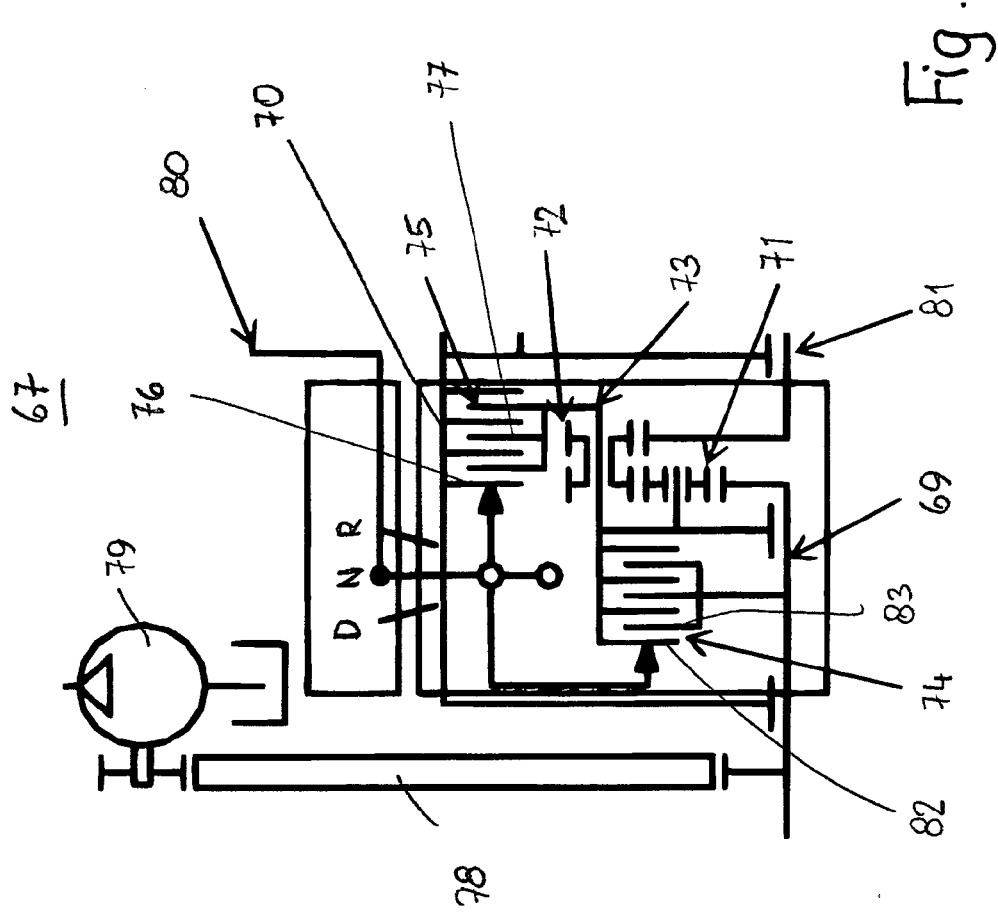
Figure 20:
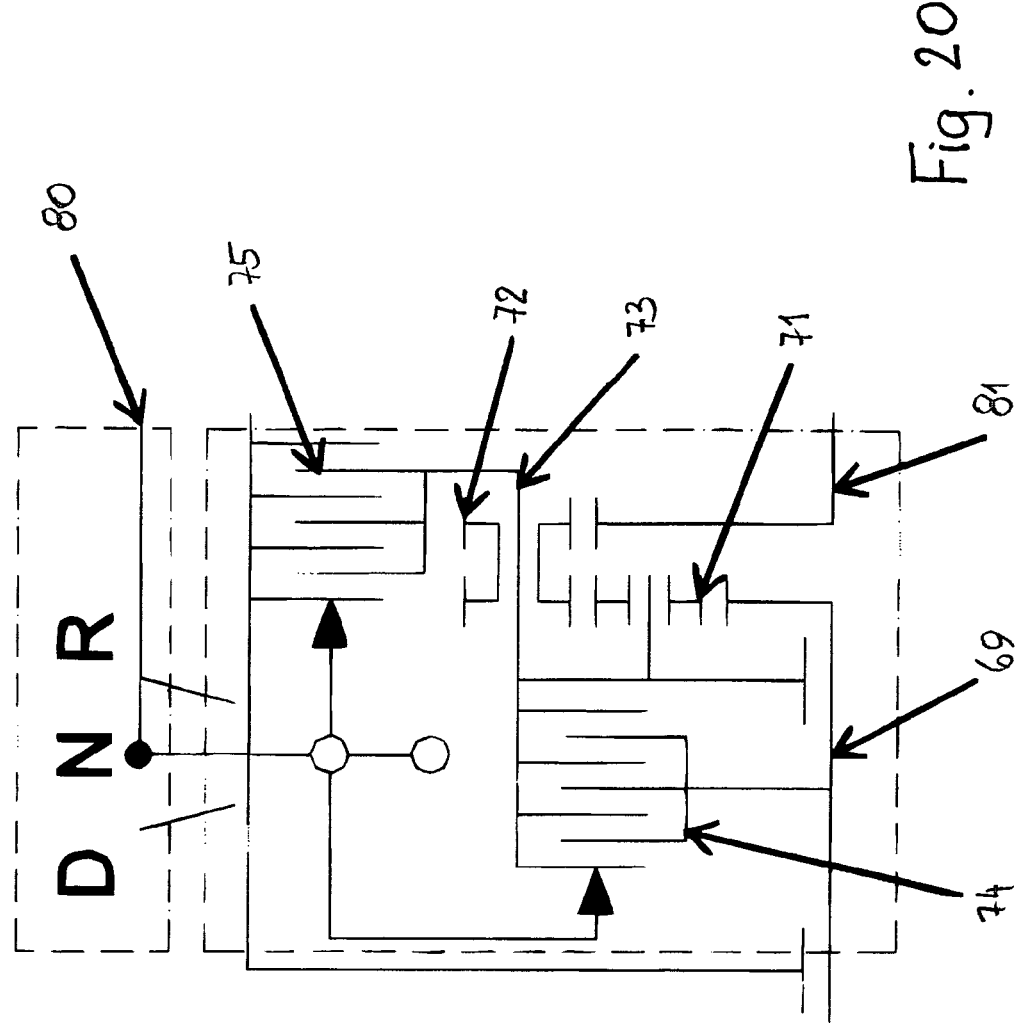
Figure 23:
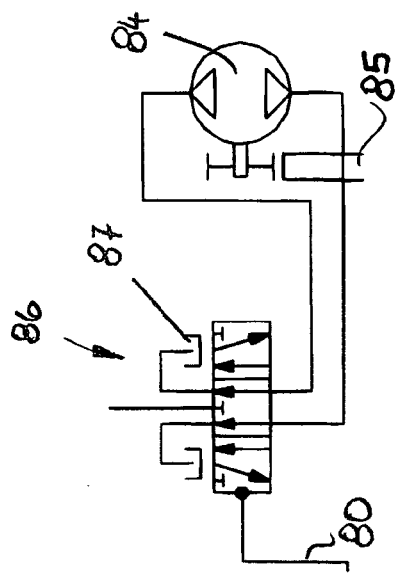
Figure 22:
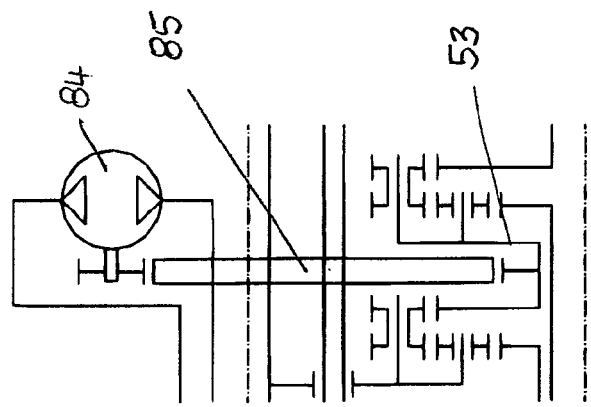
Figure 21:
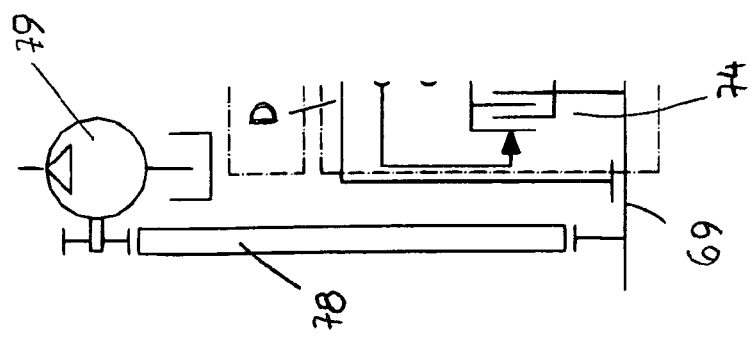
Figure 24:
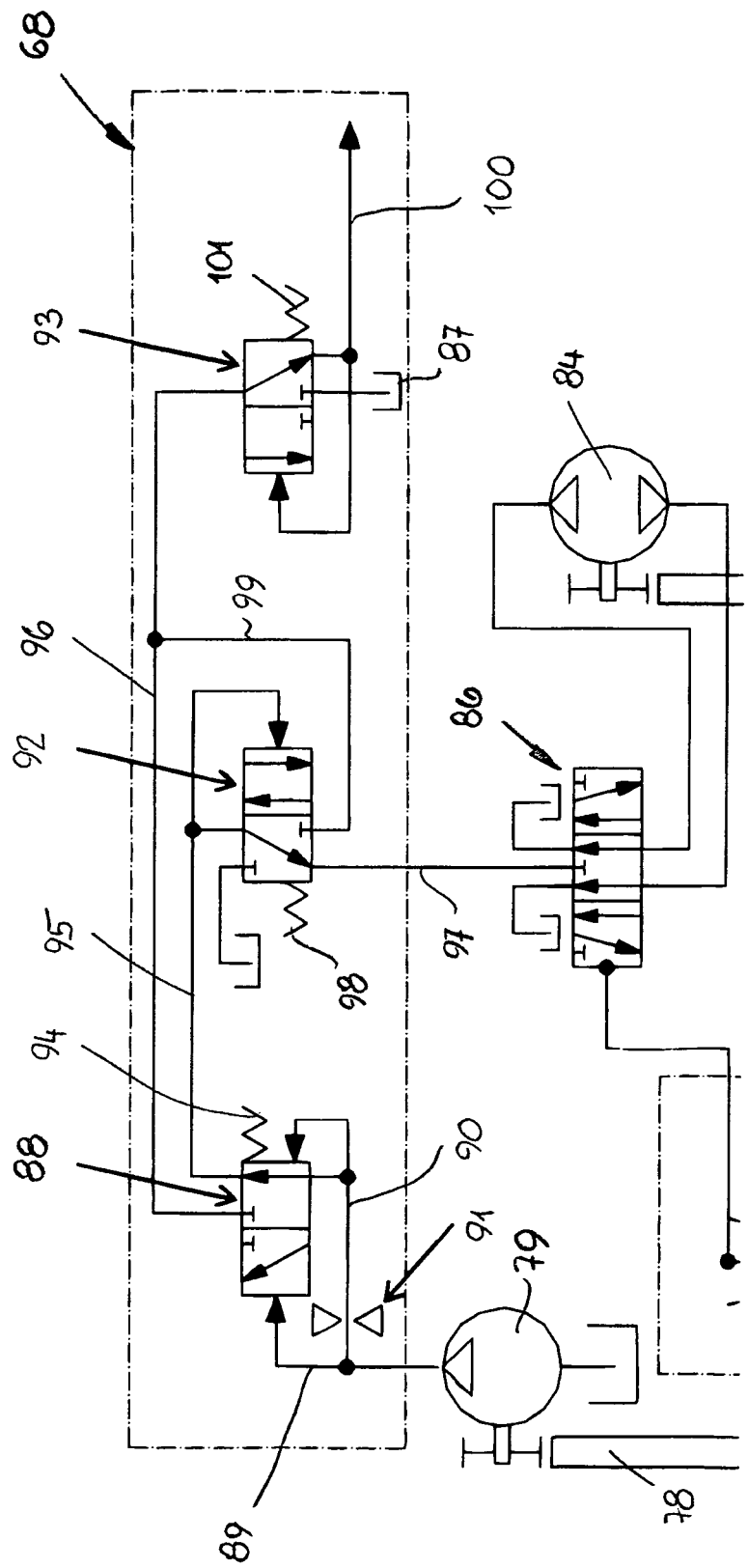
Figure 25:
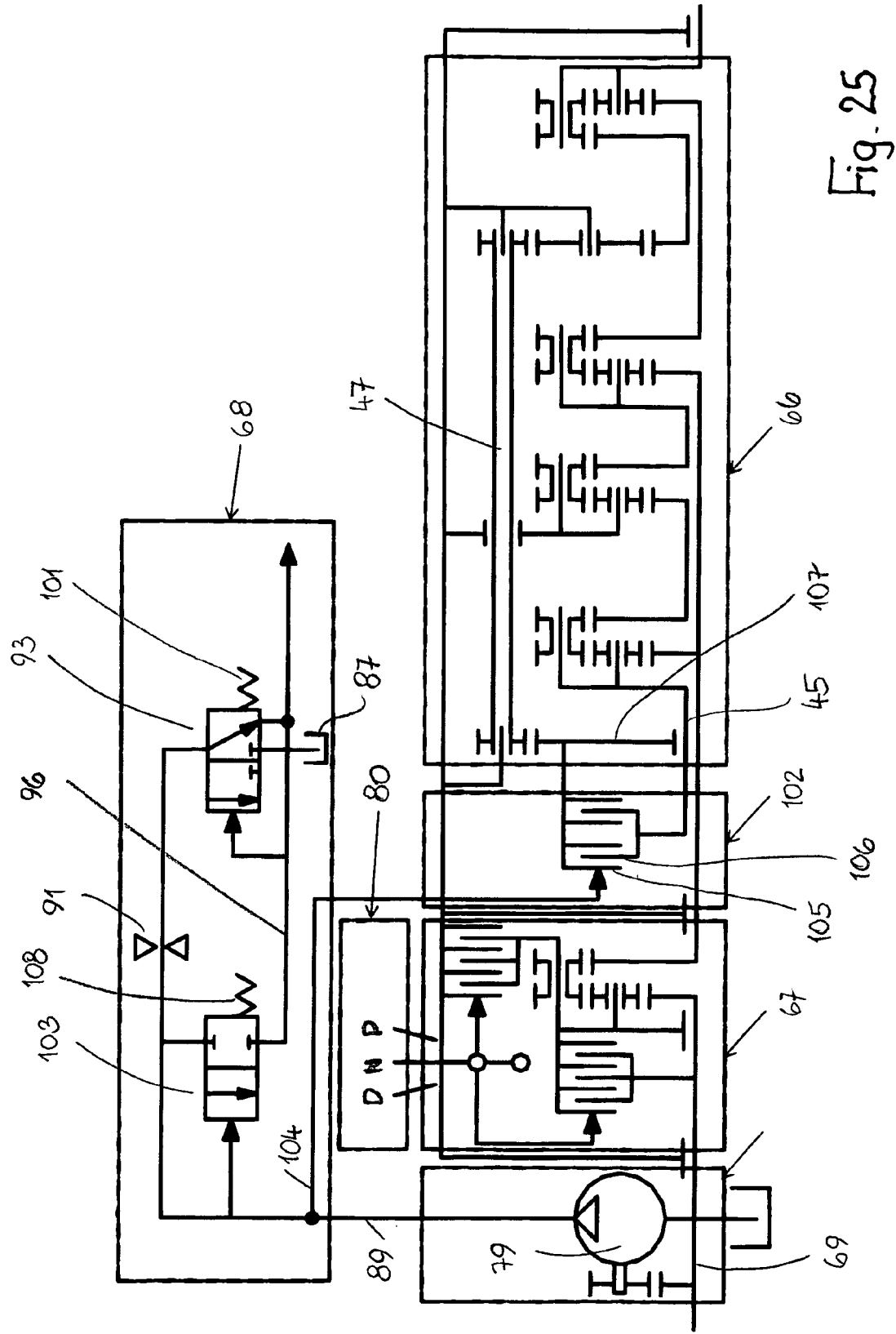
Figure 26:
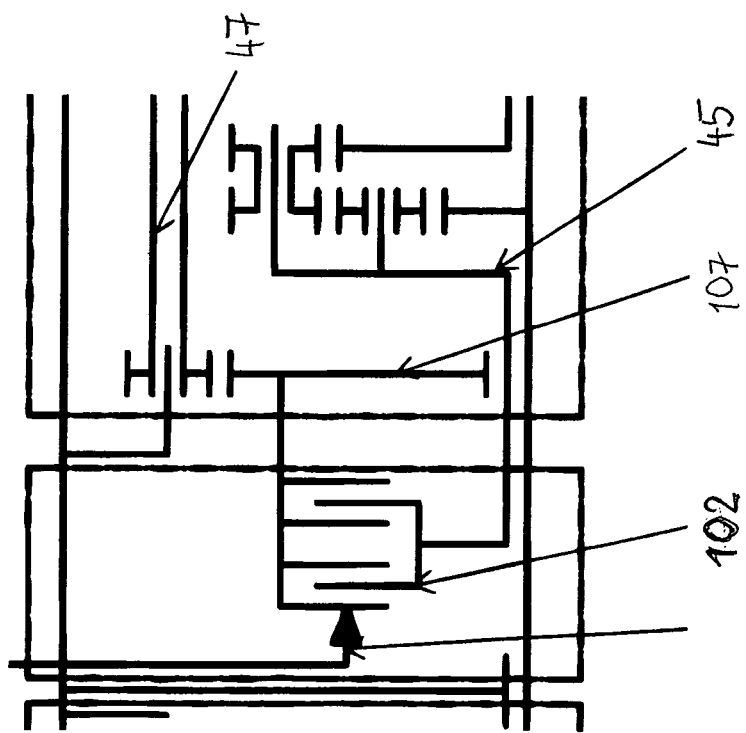
Figure 27:
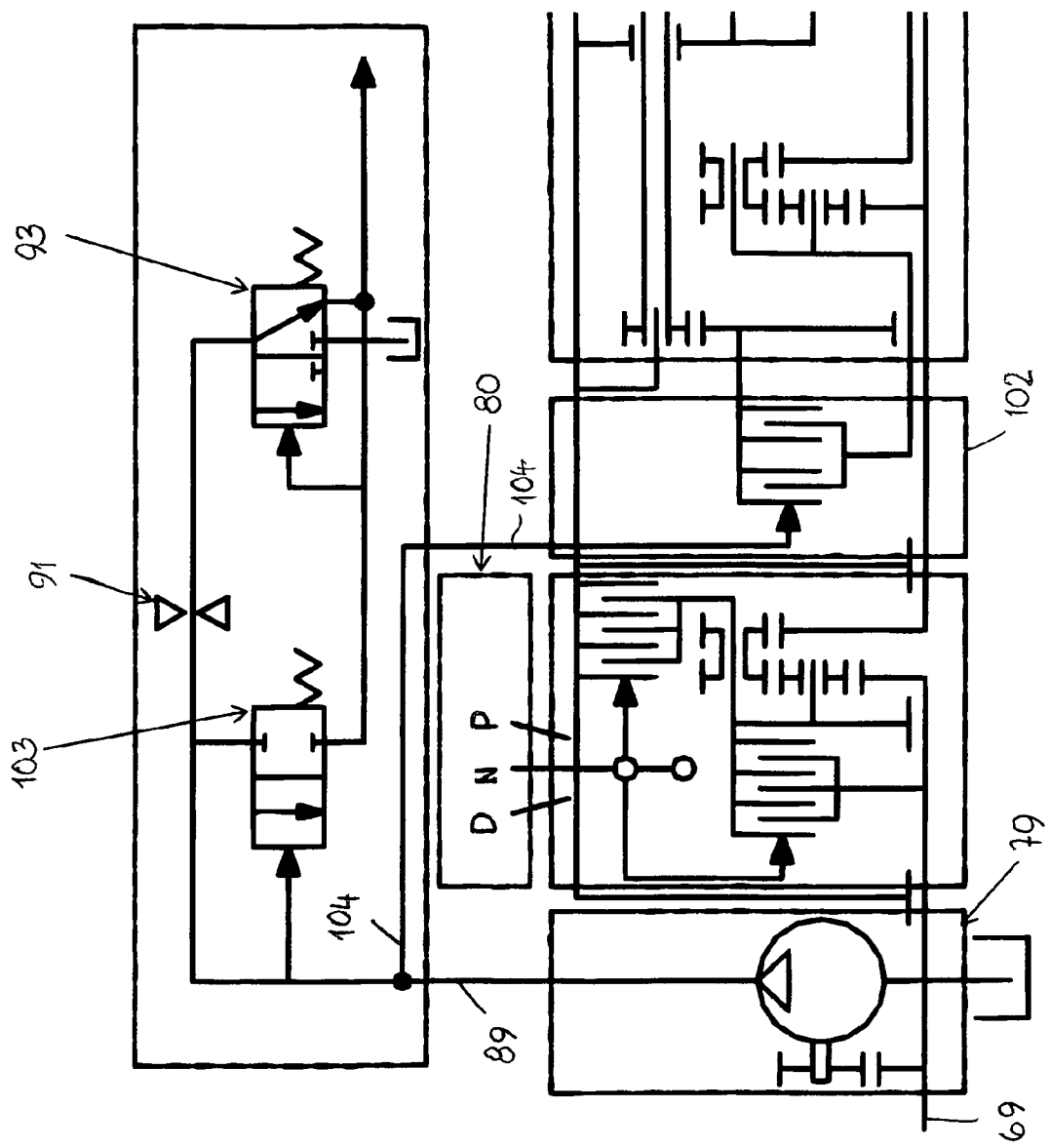

The invention will be explained in more detail with the aid of embodiments illustrated in the drawings. It is shown in:

FIG. 1 in schematic illustration the basic configuration of a transmission according to the invention;

FIG. 2 the transmission according to FIG. 1,

FIG. 3 the indication of moment directions of the transmission according to the invention;

FIG. 4 in an illustration in accordance with FIGS. 1 and 2 a second embodiment of the transmission according to the invention;

FIG. 5 the indication of moment directions of the transmission according to the invention in accordance with FIG. 4:

FIG. 6 an input stage of the transmission according to the invention according to FIG. 1;

FIG. 7 a reversing stage of the transmission according to the invention according to FIG. 1;

FIG. 8 a coupling stage of the transmission according to the invention according to FIG. 1;

FIG. 9 a coupling rocker of the transmission according to the invention according to FIG. 1;

FIG. 10 a support stage of the transmission according to the invention according to FIG. 1;

FIG. 11 a deflection stage of the transmission according to the invention according to FIG. 1;

FIG. 12 an output stage of the transmission according to the invention according to FIG. 1;

FIG. 13 an input stage of the transmission according to the invention according to FIG. 4;

FIG. 14 a reversing stage of the transmission according to the invention according to FIG. 4;

FIG. 15 a coupling stage of the transmission according to the invention according to FIG. 4;

FIG. 16 a support stage of the transmission according to the invention according to FIG. 4;

FIG. 17 an output stage of the transmission according to the invention according to FIG. 4;

FIG. 18 coupling of the transmission according to the invention according to FIG. 1 or 4 with a rotational direction gear;

FIG. 19 the rotational direction gear according to FIG. 18;

FIG. 20 in detail illustration a part of the rotational direction gear according to FIG. 19;

FIG. 21 an oil pump of the rotational direction gear according to FIG. 19;

FIG. 22 an idle motor of the transmission according to FIG. 18;

FIG. 23 a motor control valve for the idle motor according to FIG. 22;

FIG. 24 a detail of the transmission arrangement according to FIG. 18;

FIG. 25 a further embodiment of a transmission arrangement with the transmission according to the invention according to FIG. 1 or 4 in connection with a directional transmission as well as a decoupler that is arranged between the transmission and the directional transmission;

FIG. 26 a part of the transmission arrangement according to FIG. 25:

FIG. 27 in detail illustration a part of the transmission arrangement according to FIG. 25.

The transmission in the following is described for use in connection with an engine of a motor vehicle in an exemplary fashion. The transmission is however not limited to this use. It can be used, for example, also for drive trains of wind power devices, generators, mobile work apparatus and the like.

The transmission according to FIG. 1 has seven functional groups that each are illustrated by a box in dashed lines. The transmission according to FIG. 1 has an input stage 1, a downstream reversing stage 2, a downstream coupling stage 3, a coupling rocker 4, a support stage 5, a deflection stage 6 and an output stage 7.

These different functional groups 1 to 7 are arranged sequentially within the gear train. Through the input stage 1 the input torque is introduced into the transmission 1 and the respective output moment is output at the output stage 7.

The transmission is a multi-stage planetary gear system with which an input shaft 8 is in drive connection with an output shaft 9. The transmission has a housing 10 having walls in which the input shaft 8 and the output shaft 9 are rotatably supported. Adjacent to the left housing wall 11 in which the input shaft 8 is supported there is a ring gear 12 that is part of a first as well as a second planetary gear set 13 and 14. The ring gear 12 has a first inner toothing 15 engaged by planet gears 16 that are arranged so as to be distributed about the circumference of the ring gear 12. The planet gears 16 are supported rotatably on the input shaft 8 and engage an intermediate shaft 17 that extends centrally through the transmission.

The ring gear 12 has a second inner toothing 18 engaged by planet gears 19 of the planetary gear set 14. The planet gears 19 are arranged so as to be distributed about the circumference of the transmission and are seated each on a planet gear support 28 that are arranged fast with the housing.

The planet gears 19 mesh with a central sun gear 21 that surrounds the input shaft 8.

The planet gear set 13 is a component of the input stage 1 and the planet gear set 14 is a component of the reversing stage 2

Additional planet gears 22 of a planet gear set 23 that is part of the coupling stage 3 of the transmission engage the sun gear 21. The planet gears 22 are supported rotatably on a coupling support 24 that couples the coupling stage 3 with the coupling rocker 4. The planet gears 22 engage outer planet gears 25 that are also rotatably supported on the coupling support 24. The planet gears 22, 25 are arranged so as to be distributed uniformly about the circumference. The outer planet gears 25 are not only engaging the inner planet gears 22 but also engage a toothing 26 of the input shaft 8.

The planet gears 22, 25 are components of the coupling stage 3. The coupling support 24 engages planet gears 27 that are a part of the coupling rocker 4. The planet gears 27 that are arranged so as to be distributed about the circumference of the intermediate shaft 17 are rotatably supported on a planet gear support 28 that is fast with the housing. It supports also outer planet gears 29 that are engaging the inner planet gears 27 of the coupling rocker 4. These inner planet gears 27 are also in engagement with the coupling support 24.

The planet gears 29 engage within the coupling rocker 4 also the support web 30 that connects the coupling rocker 4 with the support stage 5. It surrounds the input shaft 8 and serves as a planet gear support for the outer planet gears 31 and the inner planet gears 32 of a planet gear set 33 of the support stage 5. The outer planet gears 31 engage the inner planet gears 32 that, in turn, engage the ring gear 34 that surrounds the input shaft 8. By means of ring gear 34, the support stage 5 is connectable with the deflection stage 6.

Within the deflection stage 6 planet gears 35 engage an inner toothing of the ring gear 34; they are arranged so as to be distributed about the circumference of the intermediate shaft 17 and are rotatably supported on planet gear supports 36 that are fast with the housing. The planet gears 35 engage a first outer toothing of a sun gear 37 with which the deflection stage 6 can be drivingly connected with the output stage 7.

Within the output stage 7, the sun gear 37 engages by means of a second outer toothing the planet gears 38 that are rotatably supported on the output shaft 9. In the output stage 7, the planet gears 38 surround inner planet gears 39 that are also rotatably supported on the output shaft 9 and are in engagement with them. The inner planet gears 39 that are arranged so as to be distributed about the circumference of the output stage 7 are in engagement with the intermediate shaft 17 which they surround.

In the following, the transmission will be explained for the output shaft 9 standing still and the input shaft 9 carrying out a clockwise rotation. The input shaft 8 rotates then clockwise which has the result that also the planet gears 16 and the ring gear 12 rotate clockwise. The ring gear 12 forms a control element of the transmission. The planet gears 19 also carry out a clockwise rotation. This has the result that the sun gear 21 will turn counterclockwise. Accordingly, the planet gears 22 that engage it are rotated clockwise. The planet gears 25 that are engaging them rotate accordingly counterclockwise. The coupling support 24 that forms a coupling element of the transmission rotates accordingly counterclockwise. This has the result that the inner planet gears 27 that mesh with the coupling support 24 rotate clockwise and the outer planet gears 29 rotate counterclockwise. The support web 30 meshing with the inner planet gears 27 rotates accordingly clockwise. The inner planet gears 37 supported thereon therefore also rotate clockwise while the planet gears 31 that mesh with them rotate counterclockwise. The ring gear 34 is stationary so that also the planet gears 35, the sun gear 37 as well as the planet gears 38 and 39 are standing still. Accordingly, the output shaft 9 also does not rotate. The intermediate shaft 17 that is in engagement with the planet gears 16 of the input stage 1 and the inner planet gears 39 of the output stage 7 is also standing still.

In the following, the rotational directions of the individual transmission elements will be explained when the input shaft 8 and the output shaft 9 each are rotating clockwise. The planet gears 16 continue to rotate clockwise while the ring gear 12 rotates clockwise at a reduced speed. This has the result that the planet gears 19 meshing with the ring gear 12 are also rotating clockwise at reduced speed. The sun gear 21 that is in engagement with them rotates accordingly at reduced speed counterclockwise. The inner planet gears 22 rotate at reduced speed clockwise and the outer planet gears 25 at reduced speed counterclockwise. In contrast to the aforedescribed state, in which the output shaft 9 is standing still, now the coupling support 24 is standing still. This has the result that the planet gears 27 meshing with the coupling support 24 and accordingly the outer planet gears 30 that are in engagement with them are also standing still. Also, the support web 30 that is in engagement with the outer planet gears 29 is accordingly standing still.

Since the input shaft 8 rotates clockwise, the planet gears 31 of the support stage 5 that are in engagement therewith rotate counterclockwise. The planet gears 32 that are in engagement with them are accordingly rotated clockwise. The ring gear 34 that is in engagement with the planet gears 32 is driven counterclockwise. The planet gears 35 that are in engagement therewith rotate accordingly counterclockwise. The sun gear 37 is accordingly driven in clockwise rotation. The intermediate shaft 17 rotates clockwise so that also the planet gears 39 that are in engagement therewith and the planet gears 38 engaging them are standing still relative to the sun gear 37 and to the intermediate shaft 17. Control of the various transmission elements for the described operational stages will be explained in more detail infra in an exemplary fashion.

Based on FIG. 3, the moment directions will be explained that will occur upon operation of the transmission. The minimum transmission ratio $i_{min}$ between input shaft 8 and output shaft 9 is assumed to be in an exemplary fashion 1:2 and the maximum transmission ratio $i_{max}$ from input shaft 8 to output shaft 9 is assumed to be ∞. It is assumed that the input shaft 8 rotates clockwise. Accordingly, a drive moment AM acting clockwise is generated thereat. At the planet gears 16, at the ring gear 12 as well as at the planet gears 19, coupling moments KM acting clockwise are generated, respectively. At the sun gear 21 a counterclockwise coupling moment KM is generated. Also, at the planet gears 25 a counterclockwise coupling moment KM is present while at the inner planet gears 22 a clockwise acting coupling moment KM is acting. Accordingly, at the planet gears 27 a support moment SM acting clockwise and at the outer planet gears 29 a support moment SM that is acting counterclockwise are generated.

At the support web 30 and at the outer planet gears 31 that are supported thereon a clockwise-acting support moment SM is generated, respectively. Accordingly, at the inner planet gears 32 a counterclockwise-acting support moment is existing.

The ring gear 34 as well as the planet gears 35 and 38 have each a clockwise-acting support moment SM. Accordingly, at the sun gear 37 as well as at the planet gears 39 a counterclockwise support moment SM exists. At the output shaft 9 the counterclockwise holding moment HM occurs.

A1+A2+A3 provide the moment addition sites. The site A1 is formed by the engagement of the outer planet gears 25 at the input shaft 8, the site A2 by the engagement of the planet gears 31 at the input shaft 8, and the site A3 by the engagement area between the intermediate shaft 17, where a counterclockwise-acting active moment occurs, and the planet gears 39. The engagement of the sun gear 21 at the inner planet gears 22 causes triggering of the support moment on the coupling support 24. The engagement area is identified by ASM1. The engagement area A1 between the input shaft 8 and the planet gears 25 also contributes to the triggering action of the support moment SM on the coupling support 24.

At the engagement site between the ring gear 34 and the inner planet gears 32, the support moment SM on the ring gear 34 is triggered. The engagement area A2 between the input shaft 8 and the outer planet gears 31 contributes also to triggering of the support moment SM on the ring gear 34.

In the reversing stage 2 the transmission ratio of ring gear 12:sun gear 21=1:1.5 while this transmission ratio in the deflection stage 6 is 1:2.

FIG. 6 shows the input stage 1 of the transmission according to FIG. 1. The input stage 1 is designed as a planetary gear set and has the ring gear 12 as a control element that is in engagement with the planet gears 16. They are seated rotatably on the web 40 that is part of the input shaft 8. The intermediate shaft 17 that forms the sun gear of the planetary gear set 13 is in engagement with the planet gears 16. When the sun gear 17 is standing still and the web 40 as a part of the input shaft 8 rotates clockwise, then the planet gears 16 mesh with clockwise rotation at the stationary sun gear 17 and in this way entrain the ring gear 12 meshing with them in clockwise rotation.

When at the sun gear 17 a holding moment HM that acts counterclockwise is existing and a clockwise action moment AM is introduced at the web 40, a clockwise torque corresponding to the planetary gear set transmission ratio is applied accordingly to the ring gear 12.

The reversing stage 2 is configured similar to a planetary gear set and has the planet gear supports 20 that are fast with the housing as webs. On the latter, the planet gears 19 are seated that are meshing with the sun gear 21. Moreover, the planet gears 19 are in engagement with the ring gear 12 that surrounds them. When the ring gear 12 rotates clockwise, it drives the planet gears 19 meshing with it in clockwise rotation. The sun gear 21 that is in engagement with the planet gears 19 is then driven in counterclockwise rotation.

When at the ring gear 12 a clockwise moment is applied, then on the planet gears 19 also clockwise moments are applied and at the sun gear 21 a counterclockwise moment. This corresponds to the planetary gear set transmission ratio between the ring gear 12 and the stationary sun gear 21.

The coupling stage 3 (FIG. 8) is designed as a planetary gear. It comprises the coupling support 24, the outer planet gears 25, the inner planet gears 22, the input shaft 8 as well as the sun gear 21. When the sun gear 21 rotates counterclockwise, it drives in clockwise rotation the planet gears 22 so that the outer planet gears 25 that are meshing therewith are driven in rotation counterclockwise. They mesh with the clockwise rotating sun gear 41 as part of the input shaft 8.

For a transmission ratio of sun gear 41 to sun gear 21 of 1:1 and a sun gear 21 that rotates faster counterclockwise, the coupling support 24 is caused to rotate counterclockwise.

The counterclockwise torque of the sun gear 21 transmits onto the planet gears 22 a clockwise torque and the latter transmit onto the planet gears 25 a counterclockwise torque. This counterclockwise torque effects at the sun gear 41 a clockwise torque. As a reaction or support moment at the coupling support 24 a counterclockwise support moment SM is generated. When this support moment SM is satisfied, the torque that is existing at the planet gears 25 is added to the input torque.

The coupling rocker 4 (FIG. 9) is designed like a planetary gear with the stationary web 42 fast with the housing and operates as a rotational direction reversing gear. The coupling support 24 serves as a first sun gear that meshes with the planet gears 27 that, in turn, are engaging the planet gears 29. The support web 30 acts as a second sun gear.

The counterclockwise coupling support 24 causes the planet gears 27 to perform a clockwise rotation. Accordingly, the planet gears 29 are caused to rotate counterclockwise. The support web 30 that is in engagement with the planet gears 29 is accordingly driven clockwise. For a transmission ratio of coupling support 24 to support web 30 of 1:1, the coupling support 24 providing counterclockwise input generates the same rotational speed clockwise at the support web 30. The counterclockwise acting support moment SM of the coupling support 24 is converted into a clockwise acting support moment SM at the support web 30.

The support stage 5 (FIG. 10) is embodied as a planetary gear. The support stage 5 comprises the support web 30, the planet gears 31, 32 as well as the ring gear 34. The clockwise rotating support web 30 which rotates relative to the input more slowly causes the planet gears 31 to perform a counterclockwise movement by means of which the planet gears 32 are caused to rotate clockwise. The ring gear 34 meshing with the planet gears 32 is driven clockwise.

The support moment SM that is existing at the support web 30 and acts clockwise is converted at the planet gears 31 into a counterclockwise acting support moment SM and at the planet gears 31 into a clockwise acting support moment SM.

The deflection stage 6 according to FIG. 11 is configured like a planetary gear set with a stationary web 43. The deflection stage 6 comprises the ring gear 34, the planet gears 35 as well as the sun gear 37 acting as a deflection sun gear. The clockwise rotating ring gear 34 drives the planet gears 35 in clockwise rotation so that the sun gear 37 is driven in rotation counterclockwise.

The clockwise acting support moment SM of the ring gear 34 is converted to a counterclockwise acting support moment SM at the sun gear 37.

The outlet stage 7 according to FIG. 12 is designed as a planetary gear. It comprises the sun gear 37 acting as a deflection sun, the planet gears 38, 39, the intermediate shaft 17 and the output shaft 9.

The sun gear 37 and the intermediate shaft 17 rotate clockwise at the same rotational speed. The planet gears 38, 39 are in engagement with the sun gear 37 as well as the planet gears 39. Accordingly, the output shaft 9 is brought up to the same rotational speed as the intermediate shaft 17.

The counterclockwise acting support moment SM of the sun gear 37 acts on the planet gears 38 that accordingly are imparted with a clockwise acting support moment SM. The planet gears 39 are provided accordingly with a counterclockwise acting support moment SM. The output shaft 9 thus is provided with a clockwise acting support moment.

The two clockwise acting support moments SM at the output stage 7, the clockwise acting support moment SM that is generated in the support stage 5, and the clockwise acting active torque AM that is formed by the addition of active moment and coupling element, together provide the output moment that is provided at the output shaft 9.

FIG. 4 shows a second embodiment of the transmission. This transmission comprises the input stage 1, the reversing stage 2, the coupling stage 3, the support stage 5, and the output stage 7. The input shaft 8 is rotatably supported in the housing wall 11 of housing 10. Planet gears 44 mesh with the input shaft 8 that is rotatably supported in a coupling element 45. The planet gears 44 mesh with planet gears 46 that are also rotatably supported on the coupling element 45 and that surround the planet gears 44.

The coupling element 45 engages a shaft 47 that is supported rotatably in the housing 10 and extends parallel to the input shaft 8.

The planet gears 46 mesh with a sun gear 46 that surrounds the input shaft 8. In the coupling stage 3, inner planet gears 49 are in engagement with the sun gear 48 and are supported rotatably on webs 50 fast with the housing. The planet gears 49 engage outer planet gears 51 that are rotatably supported on further webs 52 fast with the housing. The outer planet gears 51 mesh with a coupling element 53 that is embodied as a rocker on which outer planet gears 54 are rotatably supported. They mesh with inner planet gears 55 that are supported rotatably on the coupling element 53 and are in engagement with the input shaft 8.

The outer planet gears 54 are moreover in engagement with an intermediate shaft 56 that is, in turn, in engagement with inner planet gears 57 in the output stage. The planet gears 57 mesh with outer planet gears 58 that are rotatably supported on the output shaft 9. Moreover, the outer planet gears 58 mesh with a sun gear 59 that is in drive connection by means of planet gears 60 with the shaft 47 in the support stage 5. The planet gears 60 are supported rotatably on the webs 61 fast with the housing.

The output shaft 9 is rotatably supported in the housing wall as in the preceding embodiments.

In the following, in an exemplary fashion the rotational direction of the transmission elements will be explained when the input shaft 8 is driven in clockwise rotation and the output shaft is standing still. The clockwise rotating input shaft 8 drives the planet gears 44 in counterclockwise direction. The outer planet gears 46 rotate therefore clockwise. The coupling element 45 as well as the shaft 47 are standing still.

The sun gear 48 is driven in counterclockwise direction by the planet gears 46. This has the result that the planet gears 49 are driven in clockwise direction. The planet gears 51 that are engaging them are rotated accordingly counterclockwise. The coupling element 53 that engages the planet gears 51 is driven in clockwise direction.

The planet gears 55 that are meshing with the input shaft 8 are driven in counterclockwise direction so that the planet gears 54 meshing with them are driven in clockwise direction.

Since the shaft 47 is standing still, also the intermediate shaft 56, the planet gears 60, the sun gear 59, the planet gears 57 and 58 as well as the output shaft 9 are standing still.

Because the coupling element 45, the shaft 47, the planet gears 60, the sun gear 59 and the planet gears 57, 58 do not rotate, they form thus a support element where the torques are supported.

In the following, the rotational directions of the transmission elements will be described when the input shaft is driven in clockwise direction and the output shaft 9 rotates at maximum rotational speed. Because the input shaft 8 rotates clockwise, the planet gears 44 are driven in counterclockwise direction. The planet gears 46 are accordingly driven in clockwise direction. The coupling element 45 is entrained in clockwise direction. The shaft 47 is accordingly driven in counterclockwise direction because it is in engagement with the clockwise rotating coupling element 45. The planet gears 60 engaging the shaft 47 are accordingly driven in clockwise direction. This has the result that the sun gear 59 is driven in counterclockwise direction.

The sun gear 48 is standing still. Accordingly, also the planet gears 49, 51 are standing still. The coupling element 53 that is engaging the planet gears 51 is thus also standing still. The planet gears 54 rotate clockwise so that they rotate counterclockwise the planet gears 55 that are in engagement with them. The clockwise rotating planet gears 54 rotate the intermediate shaft 56 counterclockwise. The planet gears 57, 58 are standing still relative to the intermediate shaft 56 and the sun gear 59 so that the output shaft 9 is driven in rotation in counterclockwise direction.

With the aid of FIG. 5, in an exemplary fashion moment directions are described when, for example, the input shaft 8 is driven in clockwise direction and the output shaft 9 is provided with a clockwise holding moment.

At the input shaft 8, the active moment AM occurs that acts in clockwise direction. At the coupling element 45 the counterclockwise acting support moment SM occurs and at the planet gears 46 the clockwise acting coupling moment KM. Accordingly, at the inner planet gears 44 the counterclockwise acting coupling moment. KM occurs.

The sun gear 48 generates the counterclockwise coupling element KM while at the planet gears 49 meshing with it a clockwise coupling moment occurs. Accordingly, at the outer planet gears 51 meshing with them a counterclockwise coupling moment KM occurs. The coupling element 53 and the planet gears 54 have each a clockwise acting coupling moment KM while the planet gears 55 have a counterclockwise coupling moment KM.

The shaft 47 generates a clockwise acting support moment SM. The planet gears 60 that are meshing with the shaft 47 generate accordingly a counterclockwise acting support moment SM.

The intermediate shaft 56 generates a counterclockwise acting active moment AM.

At the sun gear 59 as well as at the planet wheels 57 a clockwise acting support moment SM is generated, respectively. Accordingly, at the outer planet gears 58 that are meshing with the planet gears 57 a counterclockwise acting support moment SM occurs. At the output shaft 9 a clockwise acting holding moment HM is thus generated.

The moment areas A1 A2, and A3 form moment addition sites that contribute to the total torque. The moment area A1 is formed at the engagement area between the input shaft 8 and the planet gears 44, the moment area A2 at the engagement area between the sun gear 59 and the planet gears 58, and the moment area A3 at the engagement area between the intermediate shaft 56 and the planet gears 57

Triggering the support moment SM on the coupling element 45 is realized in the areas A1 and ASM1. The area ASM1 is formed by the engagement area between the sun gear 48 and the planet gears 46.

At the areas A2 and A3 triggering of the support moment SM is realized.

The input stage 1 (FIG. 13) has the outer planet gears 54, the inner planet gears 55, the intermediate shaft 56, the coupling element 53, and the input shaft 8. It acts as a sun gear in the input stage 1. When it is driven in clockwise direction, it drives the planet gears 55 counterclockwise. The outer planet gears 54 are therefore driven in clockwise direction. The planet gears 54 mesh with the intermediate shaft 56 and accordingly cause the coupling element 53 to perform a clockwise movement when the input shaft 8 rotates faster than the intermediate shaft 56.

When at the input shaft 8 a clockwise acting torque is present, the planet gears 55 will a counterclockwise and the planet gears 54 will a clockwise acting torque, on the intermediate shaft 56 a counterclockwise torque is generated. When at the intermediate shaft 56 a clockwise acting holding moment is present, then the planet gears 54 roll on the outer toothing of the intermediate shaft 56 that is acting as a sun gear so that the coupling element 53 is caused to produce a clockwise movement with clockwise acting torque.

The reversing stage 2 according to FIG. 14 is designed as a gear for reversing rotational direction and for changing the transmission ratio. It corresponds to a planetary gear with a web fast with the housing. The reversing stage 2 comprises the coupling element 53 that is acting as an input sun gear, the planet gears 49, 51, and the sun gear 48.

The clockwise rotating coupling element 53 drives the planet gears 51 in counterclockwise direction so that the planet gears 49 that are in engagement therewith are driven in clockwise direction. The sun gear 48 is accordingly driven in counterclockwise direction by the planet gears 49.

The clockwise acting coupling element 53 is converted by the reversing stage 2 to a counterclockwise acting coupling element at the sun gear 48.

The coupling stage 3 according to FIG. 15 is embodied as a planetary gear. It comprises the sun gear 48, the planet gears 44, 46 as well as the coupling element 45.

The counterclockwise rotating sun gear 48 drives the planet gears 46 in clockwise direction and the latter, in turn, drive the planet gears 44 in counterclockwise direction. The planet gears 44 mesh with the input shaft 8. For identical rotational speed of counterclockwise rotating sun gear 48 and clockwise rotating input shaft 8, the coupling element 45 is standing still. When the sun gear 48 rotates with reduced rotational speed in comparison to the input shaft 8, the coupling element 45 is caused to rotate in clockwise direction.

The coupling moment that is acting counterclockwise on the sun gear 48 generates at the planet gears 46 a clockwise movement and at the planet gears 45 a counterclockwise acting coupling moment. This counterclockwise acting coupling element is added onto the input shaft 8 as a clockwise acting coupling element.

The engagement areas between the sun gear 48 and the planet gears 46 as well as between the planet gears 44 and the input shaft 8 generate at the coupling element 45 a counterclockwise acting support moment. Without this support moment, the described coupling element is not added onto the input shaft 8.

The support stage 5 according to FIG. 16 has the coupling element 45 which is in engagement with the shaft 47. At both ends of the shaft 47 there are toothings/gear wheels 62 that are in engagement with the coupling element 45 and the planet gears 60. By means of the planet gears 60 the sun gear 59 is driven.

The clockwise rotating coupling element 45 drives the shaft 47 in counterclockwise direction. The planet gears 60 engaging it are rotated accordingly clockwise. Accordingly, the sun gear 59 is drive counterclockwise by the planet gears 60.

The support moment that is acting in counterclockwise direction at the sun gear 59 is converted at the shaft 47 into a clockwise acting support moment, at the planet gears 60 into a counterclockwise acting one, and at the sun gear 59 into a clockwise acting one.

The output stage 7 is designed as a planetary gear and has the sun gear 59, the planet gears 57, 58, the intermediate shaft 56, and the output shaft 9.

The counterclockwise rotating sun gear 56 and the counterclockwise rotating intermediate shaft 59 rotate at the same rotational speed. When one of these two transmission elements is standing still, the respective other transmission element is standing still also. The planet gears 57, 58 rotate relative to each other as well as relative to the sun gear 59 and to the intermediate shaft 56. This has the result that the output shaft 9 always has the same rotational speed as the sun gear 59 and the intermediate shaft 56.

The counterclockwise rotating sun gear 59 acts on the planet gears 58 and the counterclockwise rotating intermediate shaft 56 on the planet gears 57. The planet gears 57, 58 are in engagement with each other and are each rotatably supported on the webs 64, 65 of the output shaft 9. The planet gears 57, 58 rotate about their respective axes but are also stationarily fixed relative to each other so that they drive the output shaft 9 in the same counterclockwise direction.

The clockwise acting support moment of the sun gear 59 acts on the planet gears 58 and generates thereat a clockwise acting support moment. It acts on the planet gears 57 and generates thereat a clockwise acting support moment. By means of the planet gears 57 at the intermediate shaft 56 a counterclockwise acting support moment is generated.

At the intermediate shaft 56 the counterclockwise acting active moment is provided to which is added the counterclockwise acting support moment generated by the planet gears 57. The two moments that are added up are then acting on the counterclockwise rotating output shaft 9 as a counterclockwise acting moment.

The two transmissions according to FIGS. 1 and 4 have the same functional elements in the form of the input shaft 8, the control element 12, 53, the intermediate shaft 17, 56, the coupling element 24, 45, the support element 30; 45, 47, and the output shaft 9. The control elements 12, 53 is arranged between the input shaft 8 and the intermediate shaft 17, 56 and engages both elements. With the control element 12, 53 the rotational speed of the input shaft 8 is changed for transmission to the intermediate shaft 17, 56 and the output shaft 9. With constant rotational speed of the input shaft 8 and with the output shaft 9 standing still, at the control element 12, 53 the highest rotational speed for this control element is generated in accordance with the respective transmission ratio. A reduction of the rotational speed of the control element 12, 43 causes an increase of the rotational speed of the output shaft 9. When the control element 12, 53 is standing still, the output shaft 9 has reached its highest rotational speed.

The control element 15, 53 is connected by the coupling element 24, 45 with the input shaft 8. The coupling element 24, 45 itself is connected by support element 30; 45, 47 with the output shaft 9 that, in turn, is in drive connection with the intermediate shaft 17, 56

The support element 30; 45, 47 and the coupling element 24, 45 are provided as transmission elements that transmit rotational speed. When the rotational speed of the output shaft 9 changes, the rotational speed of the control element 12, 53 changes also.

When at the input shaft 8 torque is applied, it is transmitted through the control element 12, 53 to the intermediate shaft 10, 56. The torque that is produced at the control element 12, 53 is added by means of the coupling element 24,45 to the torque of the input shaft 8. In order to keep up this moment addition, the coupling element 24, 45 is supported. For this purpose, the support element 30; 45, 47 is provided that is supported in the output stage 7 at the intermediate shaft 17, 56 and, together with it, generates at the output shaft 9 the output moment.

The transmission is a rotational speed and torque converter. The input power that is supplied to the transmission at the transmission input is made as output power at the output of the transmission available, minus the inner losses, such as frictional losses.

As an example, an output power of 1,000 W at an output speed of 1,000 rpm is required. Based on this, an output torque $MA=(P \times 60)/(2 \times \pi \times n)=(1,000\ W \times 60)/(2 \times \pi \times 1,000\ rpm)=9.54$ Nm is calculated.

The input speed should be, for example, 2,000 rpm. Based on this, the input moment $ME=(P \times 60)/(2 \times \pi \times n)=(1,000\ W \times 60)/(2 \times \pi \times 2,000\ rpm)=4.77$ Nm is calculated. Accordingly, at the transmission input a torque of 4.77 Nm is applied to the transmission. The torque is transmitted through the connection of the input shaft 8 via the control element 12, 53 to the intermediate shaft 17, 56. Accordingly, the input torque is present here. By means of coupling element 24, 45 and support element 30; 45, 47, so much torque is added to the torque of the input shaft 8 and of the support element 30; 45, 47 until at the output shaft 9 the required output torque of 9.54 Nm is provided. The moment ratio follows thus the total gear ratio.

FIG. 18 shows an example of how the transmission is used within a motor vehicle. In the embodiment, the transmission 66 has a configuration in accordance with FIG. 4. The transmission can also have a configuration in accordance with FIG. 1. The transmission 66 is combined with a rotational direction gear 67. The transmission unit 66, 67 is hydraulically controlled for which purpose a hydraulic control unit 68 is indicated in an exemplary fashion.

The rotational direction gear 67 (FIG. 19) has an input shaft 69 that within a housing 70 is in engagement with planet gears 71 that mesh with outer planet gears 72 that are supported rotatably on a planet gear support 73. It is part of a clutch 74 that may operate by form fit and/or friction.

In the housing 70 a brake 75 is arranged which is embodied, for example, as a multi-disc brake. It has brake discs 76 fast with the housing between which brake discs 77 that are associated with the clutch engage. They are fixedly connected with the planet gear support 73.

The input shaft 69 is drivingly connected by drive 78 that can be, for example, a chain or belt drive with an oil pump 79.

By means of a selector lever 80 the clutch 74 and the brake 75 can be actuated in a way to be described in the following.

When the input shaft 79 projecting from the housing 70 is driven in clockwise direction, then the planet gears 71 meshing therewith are caused to rotate in counterclockwise direction. The planet gears 72 meshing therewith rotate accordingly clockwise. The planet gears 72 are in engagement with an output shaft 81 that is connected with the input shaft 8 of the transmission 66, preferably is monolithically formed therewith. When the output shaft 81 is standing still, the planet gears 72 are rolling on the output shaft 81. This has the result that the planet gear support 73 is caused to move in clockwise direction.

The clutch 74 in an exemplary fashion is a multi-disc clutch and has clutch discs 82 that are connected fixedly with the planet gear support 73 and clutch plates 83 at the input shaft side that project between the discs 82.

When the selector lever 80 is moved into the position D, the clutch 74 is locked so that the input shaft 69 is connected with the planet gear support 73. The planet gear support 73 rotates then at the same rotational speed as the input shaft 69. The planet gears 71, 72 remain stationary relative to input shaft 69 and entrain thus the output shaft 81 in clockwise direction.

When the selector lever 80 is moved into the position R, then the brake 75 is locked. By means of the brake discs 76, 77, the planet gear support 73 as a result of the brake action is connected fixedly with the stationary housing 70. The planet gears 72 that are rotating clockwise drive the output shaft 81 accordingly in counterclockwise direction.

When the selector lever 80 is returned into the position "N" releases the clutch 74 and the brake 75.

The rotational direction gear 67 is designed such that the clutch 74 and the brake 75 cannot be actuated simultaneously.

The oil pump 79 is driven via the drive 78 by the input shaft 69.

The coupling element 53 of transmission 66 is connected with an idle motor 84 by means of drive 85 that may be, for example, an endless chain or belt drive. The idle motor 84 is connected to a motor control valve 86 that can be actuated by the selector lever 80. In the neutral position "N" illustrated in FIG. 23, the two oil sides of the idle motor 84 are open toward the tank 87. When the selector lever 80 is moved into the position "D", which corresponds to forward travel of the motor vehicle, the appropriate oil side of the idle motor 84 is supplied in a way to be described in the following with pressure oil while the draining side is open toward the tank 87. When, on the other hand, the selector lever 80 is moved into the position "R", which corresponds to rearward travel of the motor vehicle, the corresponding other oil side of the idle motor 84 is supplied with pressure oil while the oil then flows via the other side of the idle motor 84 back into the tank 87.

As shown in FIGS. 18 and 24, the oil pump is connected to an idle control valve 88 of the hydraulic control 68. The oil that is being conveyed by the oil pump 79 is supplied via a line 89 to the left side of the piston of the control valve 88 and via a line 90 to the right side of this piston. In the line 90 there is an aperture 91.

The idle control valve is connected with a pressure control valve 92 as well as a pressure control valve 93 that are components of the control unit 68. The motor control valve 86 is connected with the pressure control valve 92.

When the motor to be driven is idling, then the input shaft 69 of the rotational direction gear 67 rotates at idle speed. By means of the drive 78 the oil pump 79 is driven accordingly and conveys the oil via the line 89 in the direction of the idle control valve 88. Since in front of the aperture 91 a higher oil pressure is existing than behind the aperture, the two sides of the piston of the control valve 88 are supplied with corresponding pressure. The force of the pressure spring 94, by means of which the reaction point of the control valve 88 at which force the valve piston is moved to the right, is also acting onto the right piston side.

When the drive is idling, the oil that is being conveyed by the oil pump 79 is supplied by line 90 and a line 95 to the pressure control valve 92. The line 96 that is extending to the pressure control valve 93 and that is connected to the other connector of the idle control valve 88 remains closed.

When the rotational speed of the input shaft 69 of the rotational direction gear 67 increases, the rotational speed of the oil pump 97 increases and therefore correspondingly conveys more oil. In this way, the oil pressure that is existing in the line 90 in front of the aperture 91 increases so much that the valve piston is moved against the counterpressure to the right. Accordingly, the line 95 to the pressure control valve 92 is closed and the line 96 to the pressure control valve 93 is opened.

Depending on the magnitude of the spring force a higher oil pressure is required in order to move the valve piston to the right. When the pressure spring 94 is embodied to be stronger, a higher oil quantity passes through the idle control valve 88 to the pressure control valve 92.

The pressure control valve 92 is supplied in the way described from the idle control valve 88 with pressure oil. This pressure oil is conveyed farther by the pressure control valve 92 by means of line 97 to the motor control valve 86.

The valve piston of the pressure control valve 92 is loaded at the left side by means of the pressure spring 98. At the opposite piston side, the oil pressure that is existing in the line 95 is acting. When the oil pressure in the line 95 increases correspondingly strongly, the pressure that is acting on the right piston side of the pressure control valve 92 is greater than the counterpressure acting on the left piston side. Then the valve piston is moved to the right. The line 97 is then closed and a line 99 is released that opens into the line 96 to the pressure control valve 93. Accordingly, the pressure oil reaches the pressure control valve 93. With the pressure spring 98 the functional pressure for the idle motor 84 is thus determined that is connected to the motor control valve 86.

The pressure control valve 93 controls the level of the lubricant pressure. With an appropriate lubricant oil quantity the bearing locations and functional parts of the transmission are lubricated. The lubricant oil flows into the line 100. The piston of the pressure control valve 93 is loaded at the right side by the pressure spring 101. With it, the lubricant oil pressure can be adjusted at which the piston of the pressure control valve 93 will be moved to the left so that the line 96 toward the tank 87 is released.

The rotational direction gear 67 is provided upstream of the transmission 66. The internal combustion engine of the motor vehicle generates at idle rotational speed only so much torque or power that the basic function of the motor is fulfilled. The internal combustion engine can output a minimal power when required. This output of power has the result in connection with the rotational direction gear 67 that the torque that is resulting from the power is increased in accordance with the total transmission ratio of the rotation direction gear 67. This would cause the motor vehicle to move at idle speed. This is prevented in that the idle torque is not transmitted onto the output shaft 9. When at the input shaft 69/8 a torque acting in clockwise direction is acting, then, with the output shaft 9 standing still, at the coupling element 53 a clockwise acting torque is existing, as has been explained in connection with FIG. 4. When to the coupling element 53 a clockwise acting additional torque is applied, the coupling moment KM that is produced at the coupling element 53 and the support moment SM that is produced at the transmission 66 are canceled, as has been explained in connection with FIG. 5 in detail. By cancellation of the coupling moment KM and support moment SM, the torque that is introduced by the input 69/8 is neutralized as the combustion engine is idling.

This additional torque is generated by means of the idle motor 84. At idling, the oil pump 79 conveys in accordance with the idle speed a certain quantity of oil that is supplied by lines 89, 90, 95 through the idle control valve 88 and the pressure control valve 92 via the line 97 to the motor control valve 86. When the selector lever 80 is in the "N" position, then this oil flow flows in direction of the tank 87. When the selector lever 80 is in the position "D" or "R", then the oil flows to the appropriate oil side of the idle motor 84 and drives it. The oil pressure is increased until the adjusted value is reached and the pressure control valve 92 is deactivated. The idle motor 84 generates a torque that is transmitted through drive 85 to the coupling element 53 of the transmission 66 (FIG. 18).

When the rotational speed of the input shaft 69/8 increases, the oil pressure in the line 89 is increased in the described way until the idle control valve 88 switches. Then the connection to the pressure control valve 92 is closed and opened to the pressure control valve 93. Since the pressure control valve 92 is closed, no pressure oil reaches the motor control valve 86 so that the idle motor 84 is shut down and the transmission 66 operates in the described way.

FIGS. 25 to 27 show an embodiment in which the transmission 66 and the rotational direction gear 67 are connected to each other by a decoupler 102. The rotational direction gear 67 is of the same configuration as in the preceding embodiment. The transmission 66 corresponds to the embodiment according to FIG. 4. The oil pump 79 is driven by the input shaft 69 in the described way. It is connected by line 89 with a pressure control valve 103 with which the decoupler 102 is actuated. From the line 89 a line 104 branches off by means of which the pressure oil is supplied to the decoupler 102 which is comprised of meshing coupling discs 105, 106. The coupling discs 106 are connected with the coupling element 45 of the transmission 66 while the coupling discs 105 are connected with the gear wheel 107 that is meshing with the shaft 47.

The pressure control valve 103 is part of the hydraulic control unit 68 and is connected with the pressure control valve 93 for the lubricant oil control.

The oil pump 79 conveys at idle speed of the input shaft 69 an oil flow that is supplied via the line 89 in direction toward the control valves 93, 103. In the line 89 there is the aperture 91 that causes a higher pressure of the oil in front of the aperture than behind it. In front of the pressure control valve 103 the line 104 branches off the line 89.

When the selector lever 80 is in the position then to the transmission 66 no speed and no torque is supplied, i.e., the transmission 66 is standing still. When the selector lever 80 is however adjusted to the position "D" or the transmission 66 is subjected to a rotational speed that matches the rotational speed of the input shaft 69. When doing so, a minimal torque is also produced that is introduced into the transmission 66 so that the transmission 66 will begin to perform its function.

For an increase of the torque it is required that the coupling moment. KM can be supported at the coupling element 45 as a support moment SM, as has been explained in connection with FIG. 5. When such a support of the coupling moment KM at the coupling element 45 is not possible, there will also be no torque increase.

The transmission of the support moment SM from the coupling element 45 by means of gearwheel 107 onto the shaft 47 is possible only when the decoupler 102 is locked. When the internal combustion engine rotates only at minimal rotational speed and accordingly the oil pump 79 conveys only a minimal quantity of oil, no actuation of the decoupler 102 results so that it remains disengaged.

When the rotational speed of the input shaft 69 increases, the rotational speed of the pump increases also. The oil pump 79 conveys accordingly a greater quantity of oil into the line 89. This has the result that in front of the aperture 91 a correspondingly high back pressure exists. This back pressure acts via the line 104 onto the decoupler 102 that is actuated by means of this high oil pressure. The coupling discs 105, 106 are pressed against each other and in this way the decoupler 102 is locked. Accordingly, the gear wheel 107 and the coupling element 45 are connected fixedly with each other so that a torque-transmitting connection between the gear wheel 107 and the coupling element is produced. In this way, the load path from coupling moment KM to the support moment SM is closed.

The pressure control valve 103 has the task to limit the maximum oil pressure. The piston of the pressure control valve 103 is loaded by pressure spring 108 to the left. In this way, the connection of the pressure control valve 103 with the pressure control valve 93 is interrupted. When the oil pressure exerted by the pressure oil in the line 89 on the left piston side surpasses the counter pressure acting on the right piston side, the piston of the pressure control valve 103 is pushed to the right. In this way, the line 96 from the pressure control valve 103 to the pressure control valve 93 is opened so that upon opening of the pressure control valve 103 the oil can be used directly for lubrication.

The pressure control valve 93 delimits, as in the preceding embodiment, the maximum lubricant pressure. It acts via line 96 on the left piston side of the pressure control valve 93. On the right piston side the force of the pressure spring 101 is acting. When the pressure in the line 96 surpasses the spring force, the piston is pushed to the right so that the connection to the tank 87 is opened and the oil can drain into the tank 87.

When the rotational speed of the input shaft 96 drops and thus also the rotational speed of the oil pump 79, the oil pressure in the line 89 decreases again so that the piston of the pressure control valve 103 is pushed by the pressure spring 101 to the left. As a result of the minimal oil pressure in the line 89, the actuation pressure for the decoupler 102 is no longer reached so that the decoupler 102 disengages and the torque-transmitting connection between the coupling element 45 and the gear wheel 107 is interrupted. The load path of the support moment is thus interrupted.

In other respects, this arrangement operates in the same way as the preceding embodiment.

What is claimed is:

1. A transmission comprising:
at least one input element;
at least one output element;
transmission elements disposed between the at least one input element and the at least one output element,
wherein the at least one input element is in driving connection through the transmission elements with the at least one output element,
wherein the transmission elements include a control element; a coupling stage comprising a coupling element; and a coupling rocker;
wherein the coupling element connects the control element and the at least one input element to each other;
wherein the control element is adapted to change the rotational speed of the at least one input element for transmission onto the at least one output element such that the rotational speed of the at least one output element increases when the rotational speed of the control element decreases;
wherein the coupling stage is formed as a first planetary gear;
wherein the coupling rocker is embodied as a second planetary gear and forms a rotational direction reversing gear;
wherein the control element is part of a third planetary gear.

2. The transmission according to claim 1, wherein the transmission elements further include a support element, wherein the coupling element is in driving connection with the at least one output element through the support element.

3. The transmission according to claim 2, wherein the transmission elements further include an intermediate shaft, wherein the support element, for supporting the coupling element, is supported on the intermediate shaft, wherein the intermediate shaft together with the support element generates an output moment.

4. The transmission according to claim 3, wherein the support element is part of a support stage that is configured as a fourth planetary gear.

5. The transmission according to claim 2, wherein the transmission elements further include an intermediate gear, wherein the support element is formed by the coupling element and a shaft that engages the coupling element and is in driving connection with the at least one output element through the intermediate gear.

6. The transmission according to claim 5, wherein the intermediate gear is a planetary gear.

7. The transmission according to claim 1, wherein the coupling rocker comprises a planet gear support and planet gears supported on the planet gear support, wherein the coupling element engages the planet gears.

8. The transmission according to claim 1, connected to a hydraulic control unit.

9. The transmission according to claim 1, further comprising a rotational direction gear, wherein the input element is connected to the output of the rotational direction gear.

10. The transmission according to claim 9, further comprising an oil pump and an idle control valve, wherein the rotational direction gear controls through the oil pump the idle control valve that, as a function of the rotational speed of an input shaft of the rotational direction gear, ensures a lubricant supply to an engine.

11. The transmission according to claim 10, wherein the idle control valve controls a control valve for the lubricant supply.

* * * * *